US011606791B1

(12) United States Patent
Tsai et al.

(10) Patent No.: US 11,606,791 B1
(45) Date of Patent: Mar. 14, 2023

(54) MULTI-TIER COORDINATED DYNAMIC FREQUENCY SELECTION (DFS) SYSTEM

(71) Applicant: Amazon Technologies, Inc., Seattle, WA (US)

(72) Inventors: Kun Ting Tsai, Fremont, CA (US); Nathan Labadie, Santa Clara, CA (US); Cheol Su Kim, San Jose, CA (US); Sarang Wagholikar, Sunnyvale, CA (US); Omar Fawazhashim Zakaria, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 98 days.

(21) Appl. No.: 17/317,715

(22) Filed: May 11, 2021

(51) Int. Cl.
| | | |
|---|---|---|
| *H04L 12/28* | (2006.01) | |
| *H04W 72/0453* | (2023.01) | |
| *H04J 1/16* | (2006.01) | |
| *H04W 84/12* | (2009.01) | |

(52) U.S. Cl.
CPC ........ *H04W 72/0453* (2013.01); *H04W 84/12* (2013.01)

(58) Field of Classification Search
CPC ..... H04B 17/318; H04H 60/80; H04W 16/14; H04W 72/0453; H04W 74/0816
USPC .................. 370/252, 329, 430, 445
See application file for complete search history.

(56) References Cited

U.S. PATENT DOCUMENTS

| | | | |
|---|---|---|---|
| 2010/0311342 A1* | 12/2010 | Arbel .................... | H04H 60/43 455/62 |
| 2017/0041954 A1* | 2/2017 | Tsai ....................... | G01S 7/021 |
| 2017/0325210 A1* | 11/2017 | Green ............... | H04W 72/0453 |

* cited by examiner

*Primary Examiner* — John Pezzlo
(74) *Attorney, Agent, or Firm* — Lowenstein Sandler LLP

(57) ABSTRACT

Technologies directed to multi-tier coordinated dynamic frequency selection (DFS) service in a multi-tier wireless network are described. One method includes receiving, by a first wireless device, first data associated with a first set of DFS channels. The first wireless device performs a CAC on each DFS channel of the first set of DFS channels in a specified order. The first wireless device identifies a second set of DFS channels in which no radar event is found during the respective CAC and generates second data associated with the second set of DFS channels. The first wireless device receives a first request for the second data from a second wireless device. The first wireless device determines a receive signal strength indicator (RSSI) value associated with the first request and sends a first response, including the second data and the RSSI value, to the second wireless device

20 Claims, 14 Drawing Sheets

MULTI-TIER COORDINATED DYNAMIC FREQUENCY SELECTION (DFS) SYSTEM

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of digital media items. These electronic devices include one or more antennas to communicate with other devices wirelessly.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figures 1A, 1B:
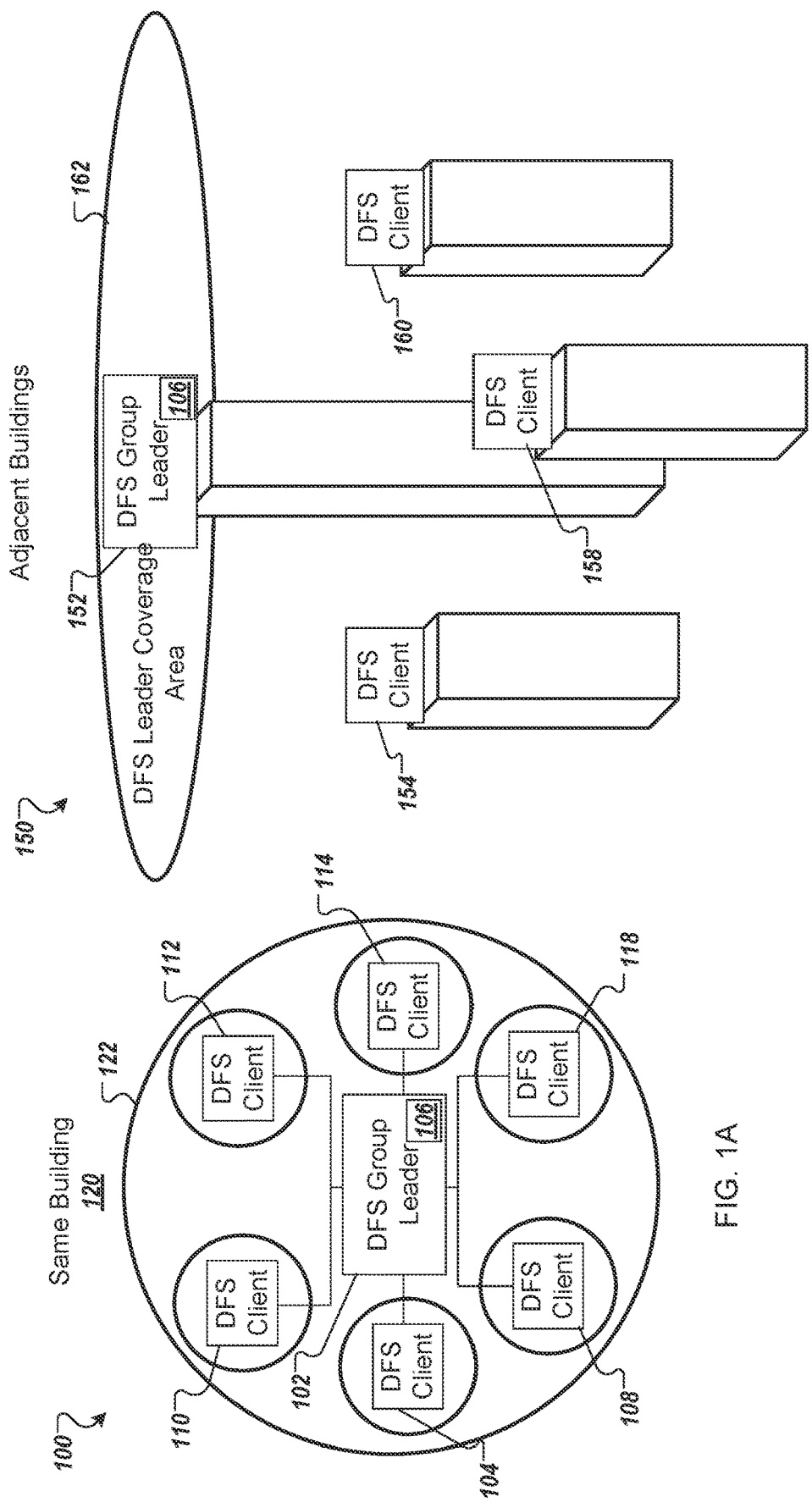
FIG. 1A is a network diagram of a DFS group leader that provides a multi-tier coordinated DFS service to devices organized in a wireless network for providing services to client devices in an environment within a same building according to one embodiment.
FIG. 1B is a network diagram of a DFS group leader that provides a multi-tier coordinated DFS service to devices organized in a wireless network for providing services to client devices in an environment with multiple adjacent buildings according to one embodiment.

Technologies directed to multi-tier coordinated DFS service in a multi-tier wireless network are described. The 2.4 GHz and 5 GHz industrial, scientific, and medical (ISM) radio bands allow unlicensed wireless communications. Due to its unlicensed nature, many short-ranged, low-power wireless communication systems operate in these frequency bands. As such, there is a limited de-license spectrum in various locations (e.g., 2.4 GHz ISM and 5 GHz U-NII bands). Various devices are described herein that include wireless local area network (WLAN) radios operate in the 2.4 GHz and 5 GHz U-NII-1 bands and utilize various WLAN protocols, such as the Wi-Fi® protocols (e.g., 802.11n, 802.11ac, or the like). The radios can utilize 2×2 spatial multiplexing MIMO and channel bandwidths from 20 MHz to 40 MHz. The radios can see all 5× GHz channels, including Dynamic Frequency Selection (DFS) channels, and can operate at an Equivalent Isotropically Radiated Power (EIRP) up to 36 dBmi, depending on the channel. The devices described herein can be deployed in a wireless network having a hierarchical topology between an Internet Service Provider (ISP) ingress to a subscriber. The wireless network is logically organized as a cascaded star topology in various embodiments, as described in more detail below.

The network architecture described herein can provide Video on Demand (VoD) and Internet services to customers at scale. The network architecture described herein can be deployed in areas with limited, traditional ISP infrastructure, for example. These services can be enabled by a combination of wired ingress, wireless connectivity, and tiered content caching in the network architecture described herein. At a high level, the network architecture of the wireless networks described herein are logically organized into hierarchical units, referred to herein as cell units, nodes, and devices.

The embodiments described herein relate to a network architecture to deliver both videos on demand (VoD) and the Internet to customers in locations with limited internet infrastructure. The network architecture includes technology to distribute VoD and Internet services to customers using wired and wireless links. The network devices are organized into three logical units known as nodes: base station nodes (BSNs), relay nodes (RLNs), and customer premises equipment (CPE) nodes (also referred to as Home access nodes (HANs)). Each node supports a unique set of network functions. The CPE node provides connectivity for in-home customer devices (FireTV, laptop) to the outdoor wireless access network. RLN aggregates the wireless access traffic from the CPEs and passes this data back to a central BSN over a wireless distribution network. The BSN aggregates both the RLN wireless distribution and local wireless access traffic to a fiber ingress point. The devices at the nodes can be manufactured as a common device type and programmed according to any of the following device roles: a router (RT) role, a base station (BS) role, a gateway (GW) role, a relay (RL) role, or a customer station (STA) role. That is, the devices can each include identical hardware and can each be programmed to operate as one of an RT, a BS, a GW, an RL, a customer STA, a NAS, or the like.

Conventionally, an AP with DFS functionality must perform a Channel Availability Check (CAC) on a DFS channel before use. During a CAC, the AP must remain silent (not transmit) on the DFS channel for a period such as 60 seconds before the AP can provide services to a client on the DFS channel. Upon detecting a radar event, the AP loses its operating channel. The radar event can be an actual radar event in which an actual radar signal is detected or, more commonly, a false radar event in which no actual radar signal is detected. IN response to a radar event, whether real or false, the AP loses its operating channel and must move to another DFS channel or a non-DFS channel. If the AP moves to another DFS channel, the AP has to perform another CAC that lasts for another 60 seconds before serving clients again. The large number of false radar events and the time required to perform the CAC make using DFS channels for backhaul communications challenging and unfeasible given the traditional DFS system.

Aspects of the present disclosure address the above and other deficiencies by organizing nodes into different service tiers (referred to herein as "multi-tier coordinated DFS system") in which a higher tier node provides DFS pre-CAC service to lower-tier nodes within its coverage area. When a lower-tier node detects a radar event on its primary channel, it can immediately fall back to one of the covered fallback channels, determined by the higher tier node, without incurring the 60-second delay from the CAC, since the higher-tier node has already performed the CAC for the fallback channel. A higher-tier node can further increase its DFS service coverage by sectorized sweeping, during which a CAC is performed in multiple directions from the higher-tier node.

In some embodiments, the multi-Tier coordinated DFS system groups nodes into tiers based on their node roles and radio frequency coverages. Each group can be assigned a unique group identifier by a DFS group leader. A node can be the DFS group leader for one group and a DFS Client for multiple groups. The DFS group leader can be a dedicated node that performs CACs for the group or integrated with nodes that provide networking service to clients. The DFS group leader can receive a prioritized DFS channel list of available DFS channels from a cloud service. The DFS group leader cycles through the prioritized DFS channel list and performs a CAC on each DFS channel in a specified sequence. Once the CAC is completed for a DFS channel, the DFS channel is added to the DFS approved list maintained by the DFS group leader. A DFS Client polls for the latest DFS approved list from the DFS group leader at specified intervals (e.g., every 10 minutes) to refresh the DFS Client's fallback channel list. If a radar event occurs and is detected by the DFS group leader, the DFS group leader removes the DFS channel from the DFS approved list. If a radar event occurs and is detected by the DFS Client, the DFS client switches to a fallback channel and marks the DFS channel as unavailable in its local DFS Approved list. The DFS group leader can further increase its DFS service coverage by sectorized sweeping.

FIG. 1A is a network diagram of a DFS group leader that provides a multi-tier coordinated DFS service to devices organized in a wireless network 100 for providing services to client devices in an environment within a same building according to one embodiment. As illustrated in FIG. 1A, the wireless network 100 includes a first wireless device 102 includes a multi-tier coordinated DFS server 106 that is programmed to operate the first wireless device 102 as a DFS group leader. In at least one embodiment, the multi-tier coordinated DFS server 106 is stored as a set of instructions in a memory device of the first wireless device 102. Alternatively, the first wireless device 102 includes processing logic comprising hardware, software, firmware, or any combination thereof to perform the operations of the DFS group leader. The DFS group leader provides a multi-tier coordinated DFS service to multiple devices in a DFS coverage area 122 as described below. Each of the other devices, including wireless devices 104, 108, 110, 112, 114, 116, and 118, is located in the same building 120 as the first wireless device 102. Each of the wireless devices 104, 108, 110, 112, 114, 116, and 118 includes a multi-tier coordinate DFS client that communicates with the DFS group leader. In at least one embodiment, the DFS group leader is a standalone device responsible for performing CACs for one or more DFS channels. In at least one embodiment, the multi-tier coordinated DFS server 106 can receive a first list from a cloud service (or a controller device) (not illustrated in FIG. 1A). The first list is referred to herein as a prioritized DFS channel list. Table 1 includes an example prioritized DFS channel list.

TABLE 1

DFS Priority List

| Channel | Bandwidth | Priority | CAC Duration (sec) | Last CAC Timestamp | Last Radar Timestamp |
| --- | --- | --- | --- | --- | --- |
| 52 | 20 | 1 | 60 | 1511079571 | 1611079571 |
| 56 | 20 | 2 | 60 | 1511079572 | 1611059572 |
| 60 | 40 | 3 | 60 | 1511079573 | 1611039576 |
| 116 | 80 | 4 | 600 | 1511079570 | 1611019578 |

In at least one embodiment, the prioritized DFS channel list includes i) an identifier of the respective DFS channel (e.g., 52, 56, 60, 116); ii) a first value indicating a bandwidth of the respective DFS channel (e.g., 20 MHz, 40 MHz, 80 MHz); iii) a priority value of the respective DFS channel (e.g., 1, 2, 3, 4); iv) a second value indicating a duration of a channel availability check (CAC) specified for the respective DFS channel; v) first timestamp data of a last CAC performed on the respective DFS channel; and vi) second timestamp data of a last radar event on the respective DFS channel. In at least one embodiment, the first list can be a DFS channel list without being prioritized by the cloud service.

In at least one embodiment, once the multi-tier coordinated DFS server 106 receives the first list, the multi-tier coordinated DFS server 106 performs a CAC on each of the DFS channels in an order starting with a DFS channel in the first set having a highest priority value (e.g., 1) and ending with a DFS channel in the first set having a lower priority value (e.g., 4). The multi-tier coordinated DFS server 106 performs the respective CAC is performed according to the ii) the first value indicating the bandwidth of the respective DFS channel (e.g., 20 MHz, 40 MHz, 80 MHz) and iv) the second value indicating the duration of the CAC specified for the respective DFS channel.

As illustrated in FIG. 1A, the Dedicate DFS Group leader can be on the same building 120 as the DFS Clients where the DFS group leader radio's sensitivity is adjusted to covers the entire building 120. DFS Clients in the same building 120 can be wired or wirelessly connected to the DFS group leader to receive the DFS Approved list. The Dedicated DFS group leader's radio sensitivity can also be adjusted to cover DFS Clients in adjacent buildings, as illustrated in FIG. 1B.

In at least one embodiment, from the results of the CACs performed on the DFS channels in the first list, the multi-tier coordinated DFS server 106 generates a second list. The second list is referred to herein as the DFS approved list. Table 2 includes an example DFS approved list.

TABLE 2

| DFS Approved list | | |
|---|---|---|
| Channel | Bandwidth | Last CAC Timestamp |
| 52 | 20 | 1511079571 |
| 56 | 20 | 1511079572 |
| 60 | 40 | 1511079573 |
| 116 | 80 | 1511079570 |

In at least one embodiment, the DFS approved list includes, for each DFS channel of the first set in which no radar event is found during the respective CAC, i) the identifier of the respective DFS channel, ii) the first value indicating a bandwidth of the respective DFS channel (e.g., 20 MHz, 40 MHz, 80 MHz); and v) the first timestamp data of the last CAC performed on the respective DFS channel. The multi-tier coordinated DFS server 106 can update the first timestamp data after performing a CAC on the respective DFS channel. The multi-tier coordinated DFS server 106 can store the DFS approved list for providing to DFS clients. In at least one embodiment, the multi-tier coordinated DFS server 106 can broadcast the DFS approved list in an information element of its beacon frame, such as over the 2.4 GHz frequency band. In at least one embodiment, the multi-tier coordinated DFS server 106 can be queried via a port of the first wireless device 102. For example, a DFS client connected to the DFS group leader via a wired connection can request the DFS approved list from a User Datagram Protocol (UDP) port of the DFS group leader. In at least one embodiment, the DFS client can send the request via the wired connection and receive a response via the wired connection. In at least one embodiment, the DFS client can send the request via the wired connection and receive a response via a wireless connection.

In at least one embodiment, the multi-tier coordinated DFS server 106 receives a first request for multi-tier coordinate DFS service from a second wireless device 104 (DFS client). In at least one embodiment, the multi-tier coordinated DFS server 106 determines a first receive signal strength indicator (RSSI) value associated with the first request. The first RSSI value is indicative of a first distance between the first wireless device 102 and the second wireless device 104. The multi-tier coordinated DFS server 106 sends a first response to the second wireless device 104. The first response includes the second list (DFS approved list) and the first RSSI value.

FIG. 1B is a network diagram of a DFS group leader that provides a multi-tier coordinated DFS service to devices organized in a wireless network 150 for providing services to client devices in an environment with multiple adjacent buildings according to one embodiment. As illustrated in FIG. 1B, the wireless network 150 includes a first wireless device 152 includes the multi-tier coordinated DFS server 106 that is programmed to operate the first wireless device 152 as a DFS group leader. The DFS group leader provides a multi-tier coordinated DFS service to multiple devices in a DFS coverage area 162, as described below. Each of the other devices, including wireless devices 154, 158, and 160, is located in a separate building as the first wireless device 152. Each of the wireless devices 154, 158, and 160 includes a multi-tier coordinate DFS client that communicates with the DFS group leader. In at least one embodiment, the DFS group leader is a standalone device responsible for performing CACs for one or more DFS channels. In at least one embodiment, the multi-tier coordinated DFS server 106 can receive the prioritized DFS channel list, as set in the example of Table 1 above.

Wireless networks 100, 150 can be logically organized into the following hierarchical units: cells, nodes, and devices according to one embodiment. A "cell unit" is a collection of wired connections and wireless connections arranged in a cellular structure. It should be noted that a cell unit is not a cell of a cellular wireless network. The cell unit is made up of smaller cell units, called pico-cell units, nano-cell units, and micro-cell units. As described herein, a pico-cell unit is a cell unit that includes customer premise equipment at customer premises (e.g., buildings, houses, or the like). The pico-cell unit is served by gateway devices from a single base station node or a relay node. A nano-cell unit is a cell unit that includes one or more pico-cell units. The nano-cell unit is served by base station devices from a single base station node. A micro-cell unit is a cell unit that includes one or more nano-cell units. The nano-cell units of the micro-cell 108 are connected via a wireless network.

A "node" is a logical network building block that is sub-divided into "infrastructure" (e.g., base station nodes, relay nodes, or the like) and "customer premises equipment (CPE)." The wireless network 100 can include the following "nodes:" a base station node (BSN), a relay node (RLN), storage (NAS) node, and a CPE node (also referred to as a home access node (HAN). A BSN connects to an Internet Service Provider (ISP) ingress via a router device, provides a first coverage (e.g., BS coverage) to the RLN, and provides a second coverage (e.g., gateway coverage) to a first CPE node, such as CPE node. The RLN connects to the BSN through a relay device and provides a third coverage (e.g., gateway coverage) to a second CPE node. The CPE node can include one or more customer stations that provide one or more access points for one or more endpoint devices at the customer premises. The first coverage can be a first wireless service, the second coverage can be a second wireless service, and the third coverage can be a third wireless service.

The nodes (e.g., BSN, RLN, and CPE node) can be organized logically in a cascaded star topology. In the cascaded star topology, a first node (e.g., first wireless device 102) can provide services to downstream nodes (e.g., second wireless device 104) as first-tier links. Downstream nodes can provide service to additional downstream nodes, such as downstream nodes as second-tier links with respect to downstream nodes. Downstream nodes can provide service to downstream nodes, such as downstream nodes as third-tier links. The cascaded star topology is a configuration of a star network that can use hubs on spokes of the star network to expand or cascade the network into additional star networks. Alternatively, the nodes can be organized in other multi-star networks or other chained interface configurations.

The network architecture of the wireless networks 100, 150 is itself device-agnostic, although various embodiments described herein can utilize wireless network devices that are each manufactured as a common device type (e.g., single SKU product) and programmed to operate as a "device role." A "device role" is a set of specific network functions associated with one or more network devices, such as a primary wireless network device (also referred to herein as "wireless device," "network device," or "D2") that is configured according to a device role (e.g., a gateway device, a customer station, or the like). For example, a wireless device configured according to the gateway role operates as a gateway (GW). In various embodiments, the common device type can be programmed to operate according to one of the following device roles: a router (RT) role, a base station (BS) role, a relay (RL) role, a gateway (GW) role, a customer station (STA) role, or a storage (NAS) role. It should be noted that the nodes of the wireless network 100 are logically organized, whereas the devices of a particular node are physically organized at a location of a customer premise, such as a single dwelling unit (SDU), a multi-dwelling unit (MDU), or at other buildings or structures as described below.

The nodes can include a network switch and multiple wireless devices of the common device type. The multiple wireless devices of the nodes can be any one or more of a base station device, a gateway device, a relay device, a router device, and/or a storage device. For example, a base station device is a wireless network device that is programmed to operate as the BS role, a gateway device is a wireless network device that is programmed to operate according to the GW role, and a relay device is a wireless network device that is programmed to operate according to the RL role. The storage device is a wireless network device that includes one or more attached storage mediums, such as USB-connected storage media (e.g., HDD, SSD, or the like), is programmed to operate according to the NAS role. That is, the storage device can be programmed to operate as a storage controller to the attached storage mediums. A CPE node can include one or more devices (referred to herein as customer premises equipment), including one or more customer stations and one or more endpoint devices. For example, a customer station can be the wireless network device manufactured and programmed to operate as the customer STA. The customer STA can provide an AP for one or more endpoint devices (not illustrated in FIGS. 1A-1B). One or more endpoint devices can be various types of wireless devices, such as mobile devices, smart TVs, TV dongles, watches, IoT devices, thermostats, home automation equipment, laptops, computers, entertainment consoles, gaming consoles, voice-controlled devices, or the like.

In one embodiment, the base station device (i.e., BS role) can use one or more radios to provide a first multi-sector, point-to-multi-point (PtMP) coverage area to one or more relay devices up to a first distance, the first distance being approximately 100 meters, for example. The base station device can use one or more radios to provide the first wireless service to the relay node and any other relay nodes located within the first distance from the base station device. The relay device can use one or more radios to provide a single sector, point-to-point (PtP) connectivity to the base station device up to a second distance, the second distance being approximately 100 meters, for example. The relay device can use one or more radios to connect with the base station device via the first wireless service and provide the third wireless service to the first CPE node and any other CPE nodes located within the second distance from the relay device. A first gateway device (at the BSN) can use one or more radios to provide a second multi-sector, PtMP coverage to one or more customer stations up to a third distance, the third distance being approximately 30 meters, for example. The first gateway device can use one or more radios to provide the second wireless service to the second CPE node and any other CPE nodes located within the third distance from the first gateway device. A second gateway device (at the RLN) can use one or more radios to provide a third multi-sector, PtMP coverage to one or more additional customer stations up to a fourth distance, the fourth distance being approximately 30 meters, for example. The second gateway device can use one or more radios to provide the third wireless service to the first CPE node and any other CPE nodes located within a fourth distance from the second gateway device. As noted above, one or more external storage mediums (at the BSN) can be coupled to the storage device, and the storage device operates as a first storage controller to one or more external storage mediums. Similarly, one or more additional external storage mediums are coupled to the optional storage device at the RLN, and the second storage device operates as a second storage controller to one or more external storage mediums.

In one embodiment, the radios of the wireless networks 100, 150 can utilize wireless protocols, such as IEEE 802.11n, IEEE 802.11ac, or the like, such as outlined in Table 3.

TABLE 3

| Item | 802.11n | | 802.11ac | |
| --- | --- | --- | --- | --- |
| | IEEE | Proposed Network | IEEE | Proposed Network |
| Release | October 2009 | | January 2014 | |
| Application | Household device connectivity (e.g., VOD service, phone, tablets) | | Infrastructure connectivity (N1 mesh, N2 star) | |
| Channel | 20/40 MHz | 20 MHz | 20/40/80/160 MHz | 20/40 MHz |
| Max Phy Rate | 600 Mbps | 140 Mbps | 1 Gbps | 400 Mbps |
| Max TCP Rate | ~400 Mbps | 1000 Mbps | ~800 Mbps | 300 Mbps |
| MIMO Type | Single user | | Single user, Multi-user | |
| MIMO Stream | 4 × 4 | 2 × 2 | 8 × 8 | 2 × 2 |
| MAC Mechanism | Frame aggregation (A-MSDU and A-MPDU), Block Ack, Reverse direction (RD) | | Enhanced Frame Aggregation (large sizes) | |
| PHY Layer (modulation) | BPSK/QSK/16QAM/64QAM | | BPSK/QSK/16QAM/64QAM/256QAM | |

TABLE 3-continued

|  | 802.11n | | 802.11ac | |
| --- | --- | --- | --- | --- |
| Item | IEEE | Proposed Network | IEEE | Proposed Network |
| Frequency Band | 2.4/5.x | 2.4 | 5.x | 5.x |
| Type | High Throughput | | Very High Throughput | |
| Number of Channels | | 3 × 20 MHz | | 5 × 40 MHz (non-DFS) + 8 × 40 MHz (DFS) |
| Protocol | CSMA-CA | | | |

As described herein, the wireless network 100 (or 150) is scalable according to the defined cell units, nodes, and device roles. The wireless network 100 (or 150) can include a first pico-cell unit that may include a first dwelling unit served by a first node 110 (e.g., a gateway device). The wireless network 100 (or 150) can also include additional pico-cell units at the same or different dwelling units. For example, a first node can provide service to downstream nodes individually, and the downstream nodes can provide service or access to downstream client devices.

During or after deployment of the various nodes in wireless network 100 or 150, multi-tier coordinated DFS server 106 can assign available channels according to a node and channel prioritization scheme. The DFS group leader can provide the DFS approved list for the channel prioritization scheme. It should be noted that the available channels can be within a single radio technology, across multiple radio technologies, and can across a single frequency spectrum or multiple frequency spectrums.

In at least one embodiment, to expand the DFS service coverage (e.g., 122, 162), a higher-tier DFS group leader can provide DFS coverage for lower-tier DFS group leaders. For example, a DFS group leader, which is implemented in a Basic Service Node (BSN) on a first building, provides the multi-tier coordinated DFS service to the Relay Node (RLN) tier of adjacent buildings. The DFS group leaders of the RLN-tier buildings provide DFS Service to the Gateway (GW) tier buildings. DFS Clients on the GW building covered by both the BSN and RLN's DFS group leaders can use the DFS Approved list from both DFS group leaders. An example of expanding the DFS service coverage is described and illustrated with respect to FIG. 2.

Figure 2:
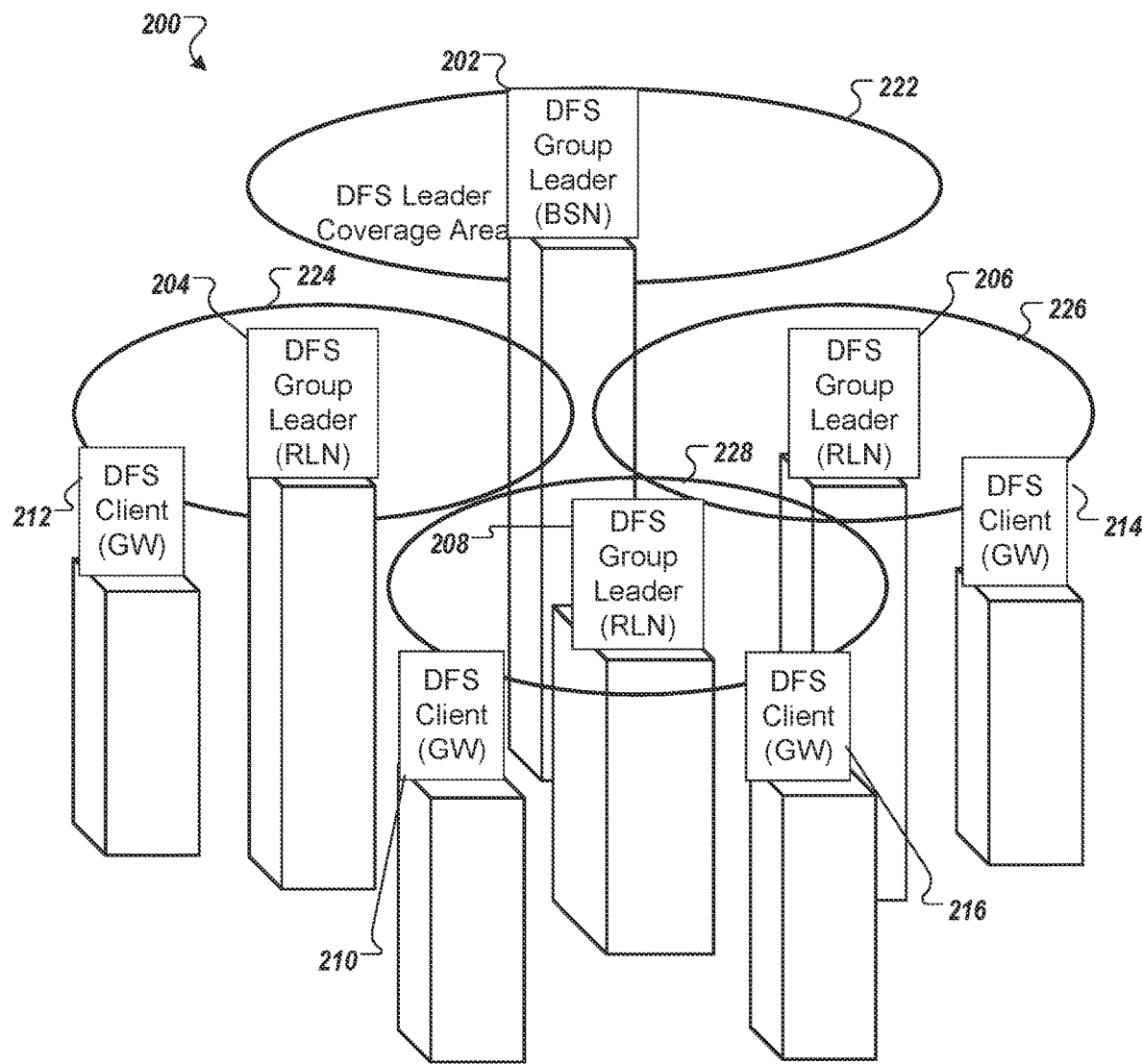
FIG. 2 is a network diagram of multiple DFS group leaders that provides a multi-tier coordinated DFS service to devices organized in a wireless network for providing services to client devices in an environment within multiple adjacent buildings according to one embodiment.

FIG. 2 is a network diagram of multiple DFS group leaders that provides a multi-tier coordinated DFS service to devices organized in a wireless network 200 for providing services to client devices in an environment within multiple adjacent buildings according to one embodiment. As illustrated in FIG. 2, the wireless network 200 includes a first wireless device 202 includes the multi-tier coordinated DFS server 106 that is programmed to operate the first wireless device 202 as a first DFS group leader. The first DFS group leader 202 provides a multi-tier coordinated DFS service to multiple devices in a first DFS coverage area 222 as described below. In at least one embodiment, a second wireless device 204 includes the multi-tier coordinated DFS server 106 programmed to operate the second wireless device 204 as a second DFS group leader and provide a second DFS coverage area 224. A third wireless device 206 and a fourth wireless device 208 are also programmed to operate as third and fourth DFS group leaders, providing third and fourth DFS coverage areas 226, 228, respectively. Each of the wireless devices 204-208 is located in a separate building as the first wireless device 202. The first wireless device 202 can be considered a first tier, and the wireless devices 204-208 are considered a second tier, which is a lower tier than the first tier. The second tier of wireless devices can provide DFS service to a third tier of wireless devices, including wireless devices 210-216. Each of the wireless devices 210-216 includes a multi-tier coordinate DFS client that communicates with one or more DFS group leaders. In at least one embodiment, the first DFS group leader is a standalone device responsible for performing CACs for the other DFS group leaders. In another embodiment, the first DFS group leader can perform CACs, and the other DFS group leaders can also perform CACs. In at least one embodiment, the multi-tier coordinated DFS server 106 of the first DFS group leader can receive the prioritized DFS channel list (e.g., Table 1) from the cloud service and provide the DFS approved list (e.g., Table 2) to the other DFS group leaders.

In at least one embodiment, to expand the first DFS coverage area 222, the first DFS group leader (e.g., 202) can provide DFS coverage for lower-tier DFS group leaders (e.g., 204, 206, 208). The second wireless device 204 provides a second DFS coverage area 224. The third wireless device 206 provides a third DFS coverage area 226. The fourth wireless device 208 provides a fourth DFS coverage area 228.

In at least one embodiment, the second wireless device 204 can send a request to the first wireless device 202. The second wireless device 204 can receive a second response from the first wireless device 202. The second response includes a third list and a second RSSI value associated with the second request. The second RSSI value is indicative of a second distance between the second wireless device 204 and the first wireless device 202. The third list can include i) the identifier of the respective DFS channel, ii) the first value indicating a bandwidth of the respective DFS channel (e.g., 20 MHz, 40 MHz, 80 MHz), and v) the first timestamp data of the last CAC performed on the respective DFS channel. In at least one embodiment, the second wireless device 204 determines that the second RSSI value, minus a value representing a transmit power of the wireless device, is greater than a threshold value. The threshold value represents a boundary of the first DFS coverage area 222. The first DFS coverage area 222 can be a specified geographical area surrounding the first wireless device 202. The threshold value can also represent a maximum distance from the first wireless device 202 for DFS service. The second wireless device 204 can update its DFS approved list with the DFS approved list received from the first wireless device 202. An example of a first DFS group leader providing the DFS approved list to two other DFS group leaders is illustrated in FIG. 3

Figure 3:
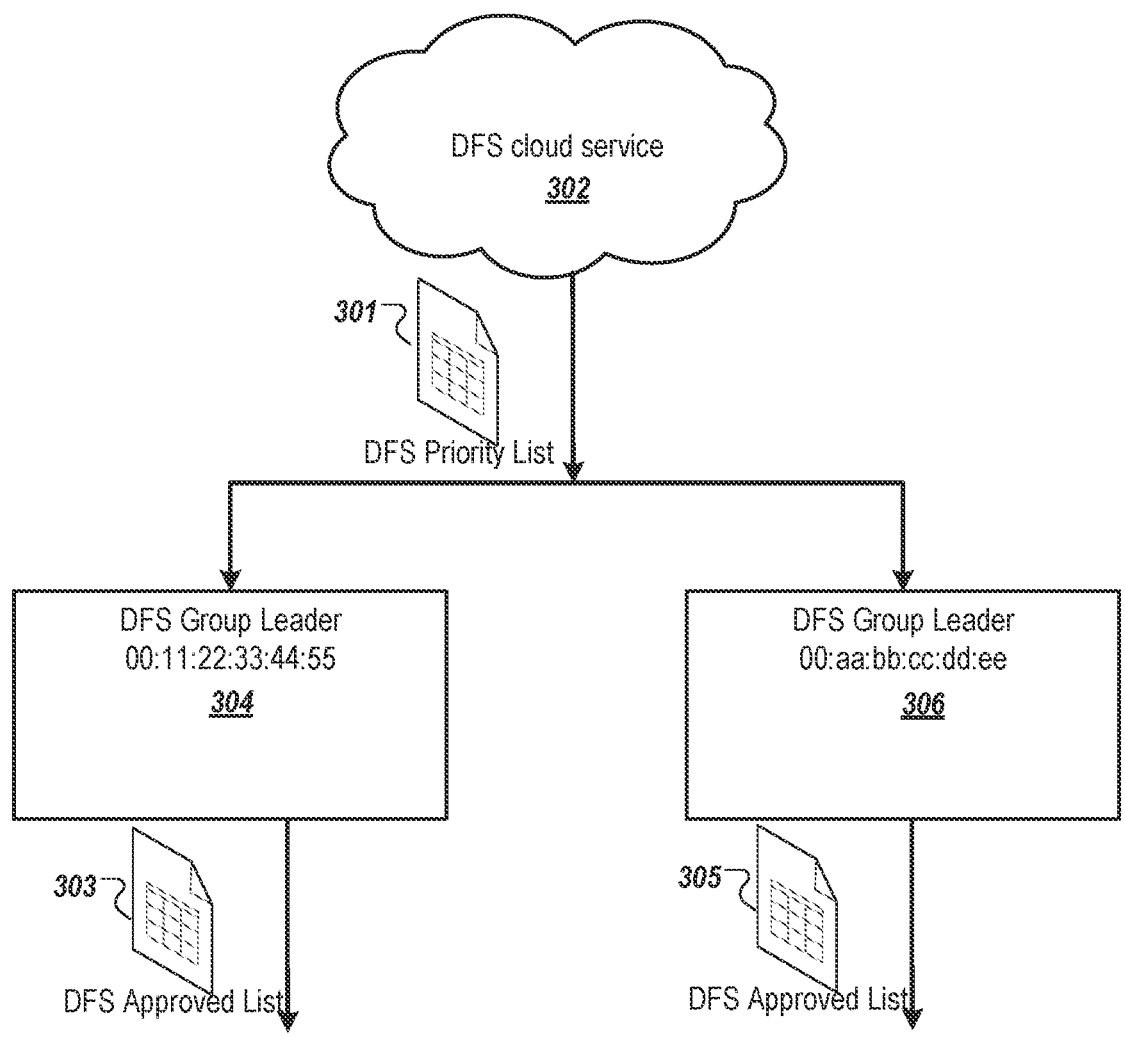
FIG. 3 is a network diagram of multiple DFS group leaders and a cloud service for distributing a DFS priority list according to one embodiment.

FIG. 3 is a network diagram of multiple DFS group leaders and a cloud service for distributing a DFS priority list according to one embodiment. A DFS cloud service 302 can be implemented in a cloud computing system. The DFS cloud service 302 can store a DFS priority list 301 and distribute the DFS priority list 301 to one or more DFS group leaders. An example of the DFS priority list 301 is set forth in Table 1 above. A first DFS group leader 304 can request the DFS priority list 301 from the DFS cloud service 302 over a network connection, such as via a private network or a public network. The first DFS group leader 304 can perform CACs on one or more of the DFS channels of the DFS priority list 301 and provide a DFS approved list 303 to one or more downstream nodes, such as one or more additional DFS group leaders, as well as one or more DFS clients, as described herein. An example of the DFS approved list 303 is set forth in Table 2 above. The second DFS group leader 306 can perform CACs on one or more of the DFS channels of the DFS priority list 301 and provide a DFS approved list 305 to one or more downstream nodes, such as one or more additional DFS group leaders, as well as one or more DFS clients, as described herein. An example of the DFS approved list 305 is set forth in Table 2 above. The DFS approved lists 303, 305 can be the same or different. In at least one embodiment, the DFS approved list 303 includes a first DFS group leader identifier, such as a first MAC address (e.g., 00:11:22:33:44:55). The DFS approved list 305 includes a second DFS group leader identifier, such as a second MAC address (e.g., aa:bb:cc:dd:ee). The DFS group leader identifier can be used for merging the contents of two separate DFS approved lists, as described herein.

Figure 4:
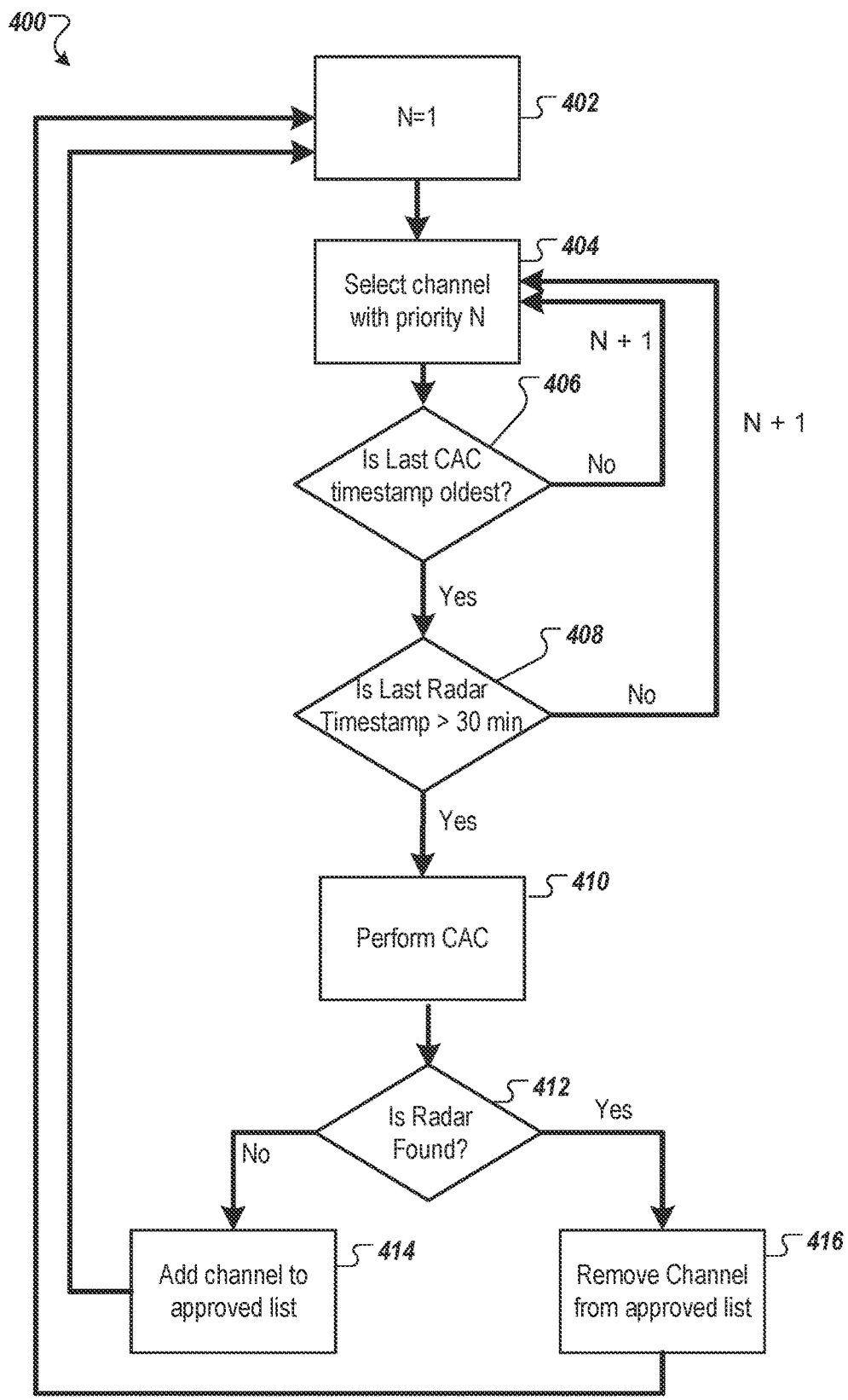
FIG. 4 is a flow diagram of a method of operation for a DFS group leader according to at least one embodiment.

FIG. 4 is a flow diagram of a method 400 of operation for a DFS group leader according to at least one embodiment. The method 400 may be performed by processing logic that comprises hardware (e.g., circuitry, dedicated logic, programmable logic, microcode, etc.), software, firmware, or a combination thereof. In one embodiment, the method 400 may be performed by multi-tier coordinated DFS server 106 of FIG. 1A-1B. In another embodiment, the method 400 may be performed by the DFS group leaders of FIGS. 1A-3. In another embodiment, the method 400 may be performed by the first wireless device 102 of FIG. 1A, the first wireless device 152 of FIG. 1B, the first wireless device 202, the second wireless device 204, the third wireless device 206, the fourth wireless device 208 of FIG. 2, the first DFS group leader 304, or the second DFS group leader 306 of FIG. 3.

Referring to FIG. 4, the method 400 begins by retrieving a DFS priority list (e.g., Table 1) and scans the DFS priority list from the highest priority (1) to the lowest priority (P) by setting a variable, N, equal to 1, where N represents a current priority level (block 402). In the absence of a cloud connection, the processing logic can use its last DFS priority list. The DFS priority list includes a list of DFS channel identifiers, a bandwidth parameter, and a priority parameter, a "CAC Duration" parameter, a "Last CAC Timestamp," and a "Last Radar Timestamp." The channel identifier defines the channel to perform the CAC. The bandwidth parameter defines the bandwidth to perform the CAC. The priority parameter defines the priority of the channel. The "CAC Duration" defines the amount of time specified for the CAC. The "Last CAC Timestamp" defines when the last CAC was performed. The "Last Radar Timestamp" defines the last radar event on the channel.

At block 404, the processing logic selects a channel with a priority equal to N. The processing logic determines if the "Last CAC Timestamp" for the selected channel is the oldest (block 406). If the "Last CAC Timestamp" is not the oldest at block 406, the processing logic increments N and returns to block 404. If the "Last CAC Timestamp" is the oldest at block 406, the processing logic determines if the "Last CAC Timestamp" is greater than a specified amount of time (e.g., 30 minutes) (block 408). If the "Last CAC Timestamp" is not greater than the specified amount of time at block 408, the processing logic increments N and returns to block 404. If the "Last CAC Timestamp" is greater than the specified amount of time at block 408, the processing logic performs a CAC according to the bandwidth parameter and the CAC duration parameter for the selected channel identifier (block 410). That is, the processing logic performs the CAC for the CAC duration on the selected channel. The processing logic determines whether there are any radar events on the selected channel during the CAC (block 412). If a radar event is found during the CAC, the processing logic removes the channel from the DFS approved list (e.g., Table 2) (or alternatively does not include the channel when generating the DFS approved list) (block 416) and returns to block 402. If a radar event is not found during the CAC, the processing logic adds the channel to the DFS approved list (e.g., Table 2) (block 414) and returns to block 402. The processing logic can repeat the method 400 of selecting a channel from the highest priority to the lowest priority and selecting the channel with the oldest Last CAC timestamp. In at least one embodiment, the processing logic can broadcast the second data (e.g., DFS approved list) in an information element (IE) of a beacon frame. The beacon frame can be sent on a sideband channel, such as in the 2.4 GHz frequency band. Alternatively, the DFS approved list can be queried from the UDP port of the first wireless device. As described herein, the DFS approved list can include the channel identifies, the bandwidth parameter, and the Last CAC timestamp for each of the DFS channels where no radar event is detected during the respective CACs by the first wireless device.

In another embodiment, the processing logic of a first wireless device receives first data. In at least one embodiment, the processing logic receives the first data from a cloud service. In another embodiment, the processing logic receives the first data from a third device, such as another DFS group leader. The first data includes, for each DFS channel of a first set of DFS channels, i) an identifier of the respective DFS channel, ii) a first value indicating a bandwidth of the respective DFS channel of the first set of DFS channels, iii) a second value indicating a duration of a CAC associated with the respective DFS channel of the first set of DFS channels, iv) first timestamp data of a prior CAC associated with the respective DFS channel of the first set of DFS channels, and v) second timestamp data of a last radar event associated with the respective DFS channel of the first set of DFS channels. The processing logic performs a CAC on each DFS channel of the first set of DFS channels in a specified order. The processing logic performs the CAC according to the ii) the first value and the iii) the second value. The processing logic updates the iv) the first timestamp data after the respective CAC is performed. As a result of the CAC(s) being performed, the processing logic identifies a second set of DFS channels in which no radar event is found during the respective CAC and the second timestamp data is greater than a specified amount of time (e.g., 30 minutes). The processing logic generates second data that includes i) the identifier, ii) the first value, and v) the second timestamp data for each DFS channel in the second set. The first data can include the DFS priority list (e.g., Table 1), and the second data can include the DFS approved list (e.g., Table 2). The second data can be stored by the processing logic until requested or can otherwise distribute the second data to one or more DFS group leaders.

In at least one embodiment, the processing logic receives a first request for the second data from a second wireless device. The processing logic determines a first RSSI value associated with the first request. The first RSSI value is indicative of a first distance between the first wireless device and the second wireless device. The processing logic generates and sends a first response to the second wireless device. The first response includes the second data and the first RSSI value.

In at least one embodiment, the first data further includes, for each DFS channel of the first set of DFS channels, vi) a priority value associated with the respective DFS channel of the first set of DFS channels. In at least one embodiment, the processing logic performs the CAC based on the respective priority values associated with the first set of DFS channels. In at least one embodiment, the processing logic performs a CAC on each DFS channel of the first set of DFS channels in a specified order based on the priority values of the first set. In at least one embodiment, the specified order starts with a DFS channel having a highest priority value and ending with a DFS channel having a lowest priority value.

In at least one embodiment, the processing logic identifies a DFS channel of the second set of DFS channels having the oldest timestamp from iv) the first timestamp data in the first data and determines whether a specified amount of time has passed since the v) the second timestamp data, associated with the DFS channel having the oldest timestamp. In response to the specified amount of time having passed since the second timestamp data, the processing logic performs the CAC on the DFS channel. The processing logic removes the DFS channel, corresponding to the oldest timestamp, from the first data, responsive to a detected radar event during the CAC. In another embodiment, the processing logic generates the second data and does not include the DFS channel with a radar event detected during the CAC.

The DFS group leaders can expand their DFS service coverage areas by exchanging DFS approved lists as described herein. In at least one embodiment, the processing logic sends a second request for third data to a third wireless device. From the third wireless device, the processing logic receives a second response that includes the third data and a second RSSI value associated with the second request. The second RSSI value is indicative of a second distance between the wireless device and the third wireless device. The third data includes, for each DFS channel of a third set of DFS channels, i) the identifier of the respective DFS channel, ii) the first value, and v) the first timestamp data for each DFS channel. The processing logic determines whether the second RSSI value, minus a value representing the transmit power of the first wireless device, is greater than a threshold value. The threshold value represents a geographical area surrounding the third wireless device. In response to the second RSSI value, minus the value of the transmit power, is greater than the threshold value, the processing logic updates the second data to include the contents of the third data.

In at least one embodiment, after the second data is updated to include the contents of the third data, the processing logic receives, from the second wireless device, a third request for the second data. The processing logic determines a third RSSI value associated with the third request. The processing logic generates and sends a third response to the second wireless device. The third response includes the third RSSI value and the second data, including the contents of the third data.

Figure 5:
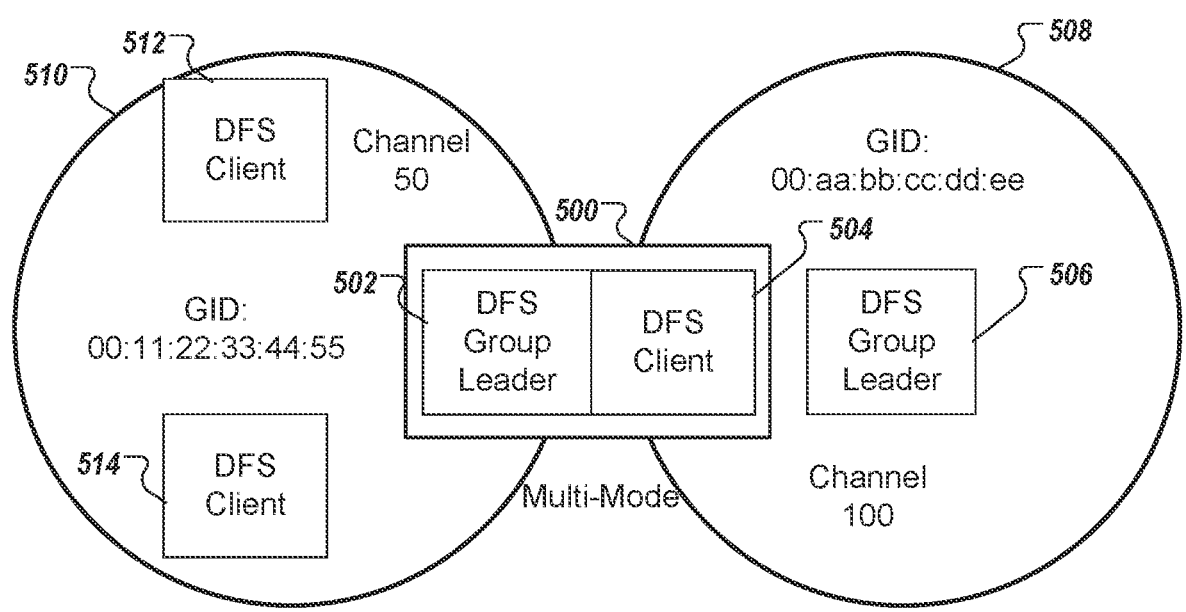
FIG. 5 is a network diagram of a wireless device that multi-mode DFS group leader according to at least one embodiment.

FIG. 5 is a network diagram of a wireless device 500 that operates as a multi-mode DFS group leader according to at least one embodiment. The wireless device 500 can operate as both a DFS group leader 502 and a DFS client 504. The DFS client 504 can communicate with a DFS group leader 506 on a first channel (e.g., 100). The DFS group leader 506 can provide a first DFS service coverage area 508, and the wireless device 500 is within the first DFS service coverage area 508. The DFS client 504 can be identified with a first identifier (e.g., 00:aa:bb:cc:dd:ee) with respect to the DFS group leader 506. The DFS group leader 502 can provide a second DFS service coverage area 510 to provide DFS service to one or more DFS clients, such as DFS client 512 and DFS client 514 located within the second DFS service coverage area 510. The DFS group leader 502 can communicate with DFS clients 512, 514 on a second channel (e.g., 50). In at least one embodiment, the wireless device 500 can be the DFS group leader on one channel for one group and the DFS client on another channel for another group. The DFS group leader 502 can be identified with a second identifier (e.g., 00:11:22:33:44:55) with respect to DFS clients 512, 514.

Figure 6:
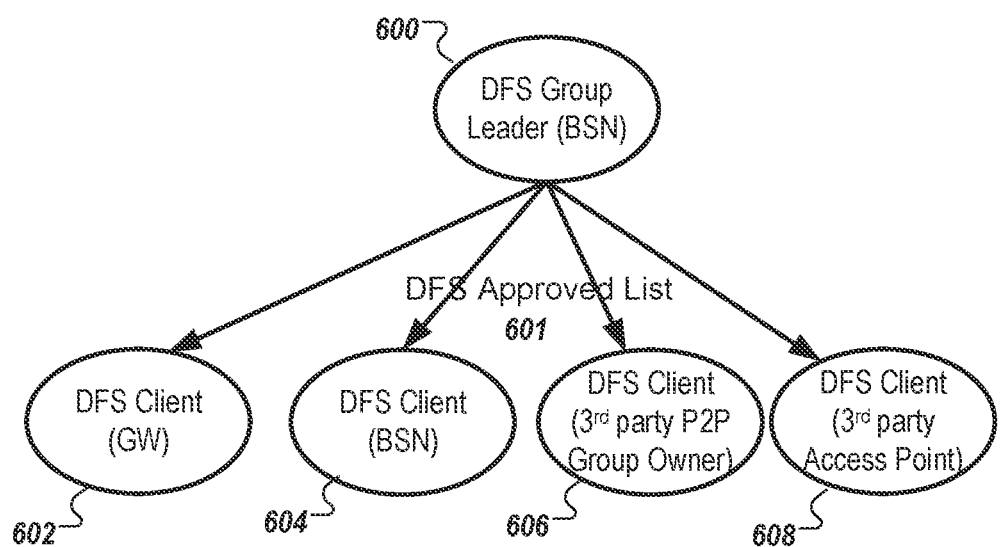
FIG. 6 is a network diagram of a DFS group leader serving DFS approved list to different DFS clients according to at least one embodiment.

FIG. 6 is a network diagram of a DFS group leader 600 serving DFS approved list to different DFS clients 602-608 according to at least one embodiment. The DFS group leader 600 can perform CACs on a set of DFS channels and generate a DFS approved list 601. The DFS group leader 600 can distribute the DFS approved list 601 to different types of DFS clients. As illustrated in FIG. 6, a first DFS client 602 is a gateway node, a second DFS client 604 is a BSN, a third DFS client 606 is a third-party peer-to-peer (P2P) group owner, and a fourth DFS client 608 is a third-party AP. Each of the different DFS client types can allow the DFS group leader 600 to perform the CACs and provide the DFS approved list 601 so that the DFS client types can select DFS channels from the DFS approved list 601. If the DFS client detects a radar event on the DFS channel, it can select another DFS channel in the DFS approved list 601 without performing a CAC. Alternatively, the DFS client can select a non-DFS channel in response to the radar event. In another embodiment, any of the DFS clients 602-608 can also operate as a downstream DFS group leader, such as described above with respect to FIG. 5.

Each wireless device of DFS clients 602-608 is programmed to operate the respective wireless device as a multi-tier coordinated DFS client. In at least one embodiment, the multi-tier coordinated DFS client is stored as a set of instructions in a memory device of the wireless device. Alternatively, the first wireless device 102 includes processing logic comprising hardware, software, firmware, or any combination thereof to perform the operations of the DFS clients, such as described below with respect to FIGS. 7-8.

Figure 7:
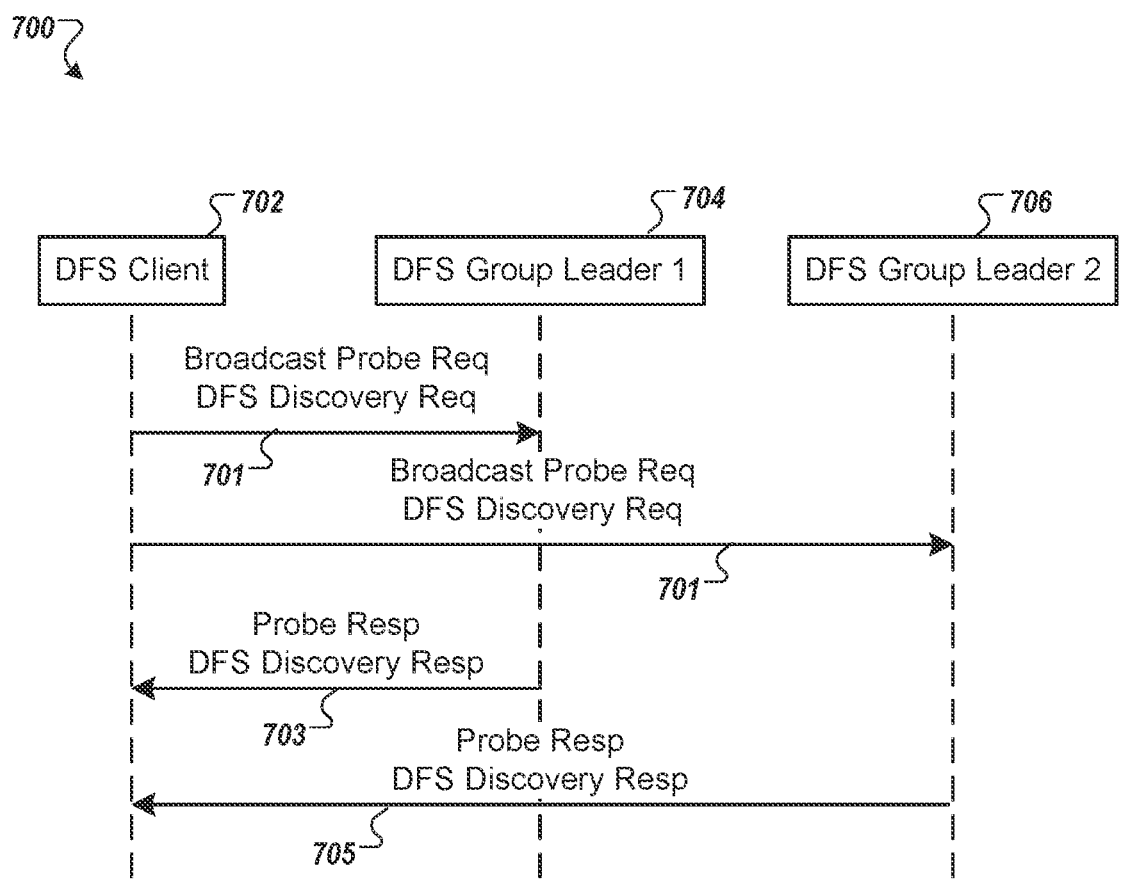
FIG. 7 is a sequence diagram of a DFS client discovery process according to at least one embodiment.

FIG. 7 is a sequence diagram of a DFS client discovery process 700 according to at least one embodiment. In the DFS client discovery process 700, a DFS client 702 discovers neighboring DFS Group leaders by transmitting a probe request 701 over a 2.4 GHz frequency band. The probe request 701 can include a DFS Discovery Request embedded in an Information Element of the probe request 701. The DFS Group leaders 704, 706 (in this example) receive the probe request 701, 703 with the DFS Discovery Request Information Element. The first DFS group leader 704 responds with a first probe response 703. The first probe response 703 includes DFS Discovery Response embedded in the Information Element of the probe response 703. The DFS Discovery Response includes the RSSI that the first DFS group leader 704 measured from the DFS client's probe request 701. The DFS Client 702 uses the RSSI in the DFS Discovery Response to determine the DFS Client's proximity to the first DFS group leader 704.

The second DFS group leader 706 responds with a second probe response 705. The second probe response 705 includes DFS Discovery Response embedded in the Information Element of the probe response 705. The DFS Discovery Response includes the RSSI that the second DFS group leader 706 measured from the DFS client's probe request 701. The DFS Client 702 uses the RSSI in the DFS Discovery Response to determine the DFS Client's proximity to the second DFS group leader 706.

In one embodiment, an example of the information element of the beacon frame and a TLV table, Table 4, are set forth below.

Information Element

Element ID: 221

Length: <length of Amazon TLVs+length of OUI>

OUI: 68-54-FD enum AmazonTLVType {

DISCOVERY_REQUEST,

DISCOVERY_RESPONSE,

};

TABLE 4

| TLV Table | | |
|---|---|---|
| TLV Type | TLV Length | TLV Value |
| DISCOVERY REQUEST | 4 | 0x1 |
| DISCOVERYRESPONSE | Length of response to Discovery Request | List of Group leaders' Group Ids, and RSSI of Probe Request received |

An example of the DFS Discovery Response is set forth below.

Example of DISCOVERY_RESPONSE

Element ID: 221

Length:

OUI: 68-54-FD

DISCOVERY_RESPONSE: aa:bb:cc:dd:ee:ff, −50; 00:11:22:33:44:55, −76; 00:a0:b0:c0:d0:e0, −50

In at least one embodiment, the DFS client 702 can determine whether it is located within the DFS service coverage area of a DFS Group leader by the following formula:

RSSI of Probe Request received by DFS Group leader−DFS Client TX power>−62 dBm

If the DFS client 702 determines it is inside the DFS Group leader's service coverage area, the DFS client 702 listens for the DFS Group leader's 2.4 GHz beacon containing the DFS Approved list. If the DFS client 702 has direct network access to the DFS Group leader, the DFS client 702 can also retrieve the DFS Approved list from the DFS Group leader's UDP port. The DFS client 702 maintains an internal DFS Approved list by combining (union) of all the DFS Approved lists from all the DFS Group leaders whose service coverage area covers the DFS client 702. Table 5 includes an example of the DFS Client Approved list.

TABLE 5

DFS Client Approved list

| Channel | Bandwidth | Last Radar Timestamp | DFS Group leader Group Id |
|---|---|---|---|
| 52 | 40 | 0 | 00:11:22:33:44:55 |
| 60 | 40 | 0 | 00:11:22:33:44:55 |
| 116 | 80 | 0 | 00:aa:bb:cc:dd:ee |

In at least one embodiment, the DFS client 702 requests the new DFS Approved list from all of its DFS Group leaders periodically, e.g., every 10 minutes, and modifies its internal DFS approved list, accordingly. If the same channel is covered by multiple DFS Group leaders but of different bandwidth parameters, the DFS client's internal DFS Approved list shall contain entries for different bandwidth of the same channel. Table 6 includes an example of the DFS client combining DFS approved lists from two DFS group leaders. Table 7 includes an example of a combined DFS Client Approved list.

TABLE 6

DFS Client combining DFS Approved list from two DFS Group leaders

| DFS Group leader Approved list Group Id: 00:1 L 1:22:33:44:55 | | DFS Group leader 2 Approved list Group Id: 00:aa:bb:cc:dd:ee | |
|---|---|---|---|
| Channel | Bandwidth | Channel | Bandwidth |
| 52 | 20 | 52 | 40 |
| 116 | 40 | 116 | 80 |

TABLE 7

DFS Client Approved list combined

| Channel | Bandwidth | Last Radar Timestamp | DFS Group leader Group Id |
|---|---|---|---|
| 52 | 20 | 0 | 00:11:22:33:44:55 |
| 52 | 40 | 0 | 00:aa:bb:cc:dd:ee |
| 116 | 40 | 0 | 00:11:22:33:44:55 |
| 116 | 80 | 0 | 00:aa:bb:cc:dd:ee |

In at least one embodiment, when a radar event is detected when the DFS client 702 is in In-Service Monitor mode, the DFS client 702 marks the channel as unavailable by updating the Last Radar Timestamp field in its internal DFS Approved list. The unavailable channel can become available after the specified amount of time (e.g., 30 minutes) and if the channel is still available from the DFS Approved list from one of its DFS Group leaders.

Figure 8:
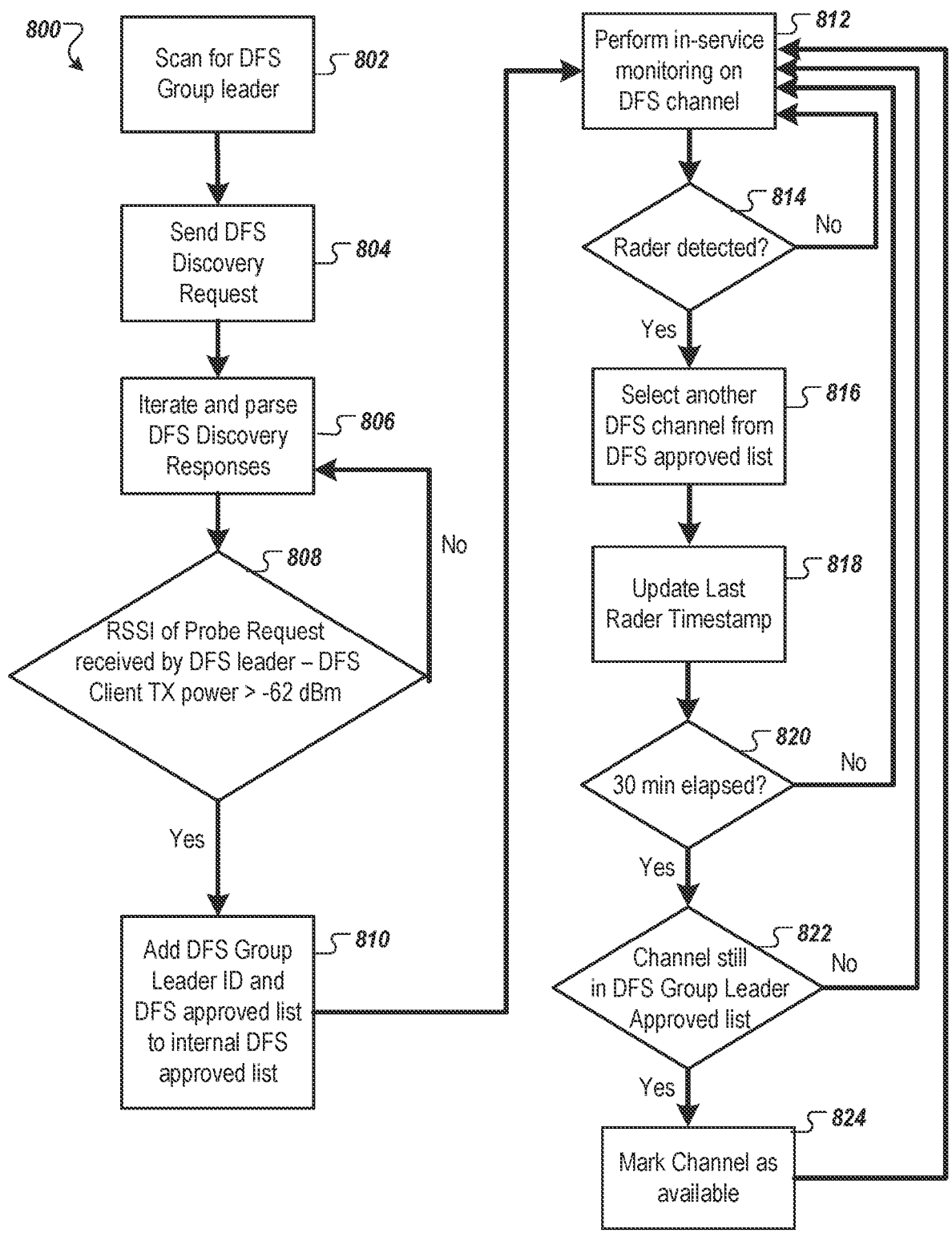
FIG. 8 is a flow diagram of a method of operation for a DFS client according to at least one embodiment.

FIG. 8 is a flow diagram of a method 800 of operation for a DFS client according to at least one embodiment. The method 800 may be performed by processing logic that comprises hardware (e.g., circuitry, dedicated logic, programmable logic, microcode, etc.), software, firmware, or a combination thereof. In one embodiment, the method 800 may be performed by any of the multi-tier coordinated DFS clients of FIGS. 1A-1B, 2, 5, and 6. In another embodiment, the method 800 may be performed by the second wireless device 104 of FIG. 1A, the second wireless device 154 of FIG. 1B, the wireless devices 210, 212, 214, and 216 of FIG. 2.

Referring to FIG. 8, the method 800 begins by processing logic actively scans for one or more DFS group leaders on the 2.4 GHz channels (block 802). The processing logic discovers the neighboring DFS group leaders by transmitting a probe request over the 2.4 GHz channels with a DFS Discovery Request embedded in the Information Element of the probe request (block 804). The DFS Group leaders receiving the probe request with DFS Discovery Request Information Element respond with DFS Discovery Responses embedded in the Information Element of the probe responses. Each of the DFS Discovery Responses also includes an RSSI value measured by the respective DFS group leader. The processing logic iterates and parses the DFS Discovery Response (block 806). The processing logic determines whether the RSSI value, minus the client's transmit power, is greater than a specified threshold (e.g., −62 dB). If the RSSI value, minus the client's transmit power, is not greater than the specified threshold at block 808, the processing logic continues to iterate and parse any additional DFS Discovery Responses. If the RSSI value, minus the client's transmit power, is greater than the specified threshold at block 808, the processing logic adds the DFS group leader identifier and DFS approved list to an internal DFS approved list (block 810). The processing logic performs in-service monitoring of the DFS channels of the approved DFS list (block 812). The processing logic determines whether a radar event is detected (block 814). If no radar event is detected at block 814, the processing logic returns to block 812 to continue in-service monitoring. If a radar event is detected at block 814, the processing logic selects another DFS channel from the internal DFS approved list (block 816) and updates the Last Radar Timestamp (block 818). The processing logic can mark this channel as unavailable for a specified amount of time (e.g., 30 minutes). The processing logic determines whether the specified amount of time has elapsed (block 820) since the radar event was detected at block 814. If the specified amount of time has not lapsed, the processing logic returns to block 812 to continue in-service monitoring. If the specified amount of time has elapsed, the processing logic determines whether the DFS channel is still in the DFS approved list(s) received from the DFS group leaders. If the DFS channel is still in the DFS approved list(s), the processing logic marks the DFS channel as "available" in the internal DFS approved list (block 824), and returns to block 812 to continue in-service monitoring. If the channel is no longer in the DFS Group Approved list(s) at block 822, the processing logic returns to block 812 to continue in-service monitoring. In this case, the DFS channel is still marked as unavailable in the internal DFS approved list.

Figure 9:
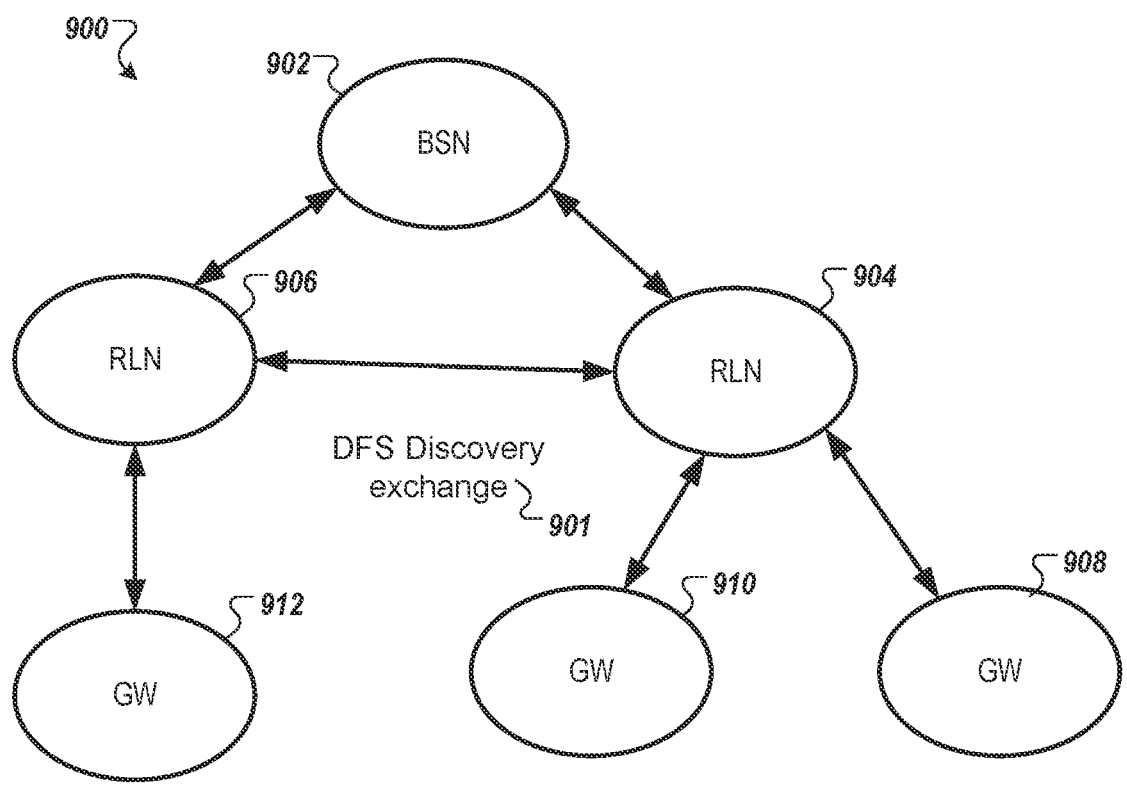
FIG. 9 is a network diagram of a DFS group leader in a multi-tier deployment according to at least one embodiment.

In at least one embodiment, the DFS group leader in a multi-tier deployment can exchange DFS approved lists with other DFS group leaders in the multi-tier deployment, as illustrated in FIG. 9.

FIG. 9 is a network diagram of a DFS group leader in a multi-tier deployment 900 according to at least one embodiment. The multi-tier deployment 900 includes multiple DFS group leaders 902-912. A first DFS group leader 902 is implemented at a BSN. A second DFS group leader 904 is implemented at a first RLN. A third DFS group leader 906 is implemented at a second RLN. A fourth DFS group leader 908 is implemented at a first gateway coupled to the first RLN. A fifth DFS group leader 910 is implemented at a second gateway coupled to the first RLN. A sixth DFS group leader 912 is implemented at a third gateway coupled to the second RLN. As described herein, any of the DFS group leaders 902-912 can exchange DFS approved lists with one another.

As illustrated in FIG. 9, the second DFS group leader 904 and the third DFS group leader 906 exchange DFS information. In at least one embodiment, the second DFS group leader 904 actively scans other DFS Group leaders on the 2.4 GHz channels. The second DFS group leader 904 discovers the neighboring DFS Group leaders by transmitting a probe request 901 over the 2.4 GHz frequency channels with DFS Discovery Request embedded in the Information Element of the probe request 901. The third DFS group leader 906 receiving the probe request 901 with DFS Discovery Request IE responds with a DFS Discovery Response embedded in the Information Element of the probe response. The second DFS group leader 904 stores the DFS Discovery Responses in a DFS Peer Discovery Table. An example of the DFS Peer Discovery Table is provided in Table 8 below.

TABLE 8

DFS Peer Discovery Table

| Source Group leader Group Id | Destination Group leader Group Id | RSSI from Discovery Response |
|---|---|---|
| 00:11:22:33:44:55 | 00:aa:bb:cc:dd:ee | −50 |
| 00:11:22:33:44:55 | 00:a0:b0:c0:d0:e0 | −60 |

In at least one embodiment, the second DFS group leader 904 propagates the DFS Peer Discovery Table to a cloud service or other controller. The cloud service can use the DFS Peer Discovery Table to prioritize the DFS Priority List for the DFS Group leaders.

In at least one embodiment, in the multi-tier deployment 900, a lower-tier DFS Group leader uses the DFS Discovery Response from a higher-tier DFS Group leader to expand the lower-tier DFS group leader's DFS service coverage area and corresponding DFS Approved list. In at least one embodiment, the lower-tier DFS group leader can expand the DFS service coverage area and corresponding DFS approved list by using the following equation:

RSSI of Peer DFS Group leader's beacon−Self *TX* Power>−62 dB

In at least one embodiment, the probe response can include an RSSI value associated with the probe request. This is the RSSI of the Peer Group Leader's beacon. The transmit power of the receiving DFS group leader is subtracted from the RSSI value and compared to a specified threshold (e.g., −62 dB) to determine whether the receiving DFS group leader is within the coverage area of the sending DFS group leader to expand the service coverage area.

Figure 10:
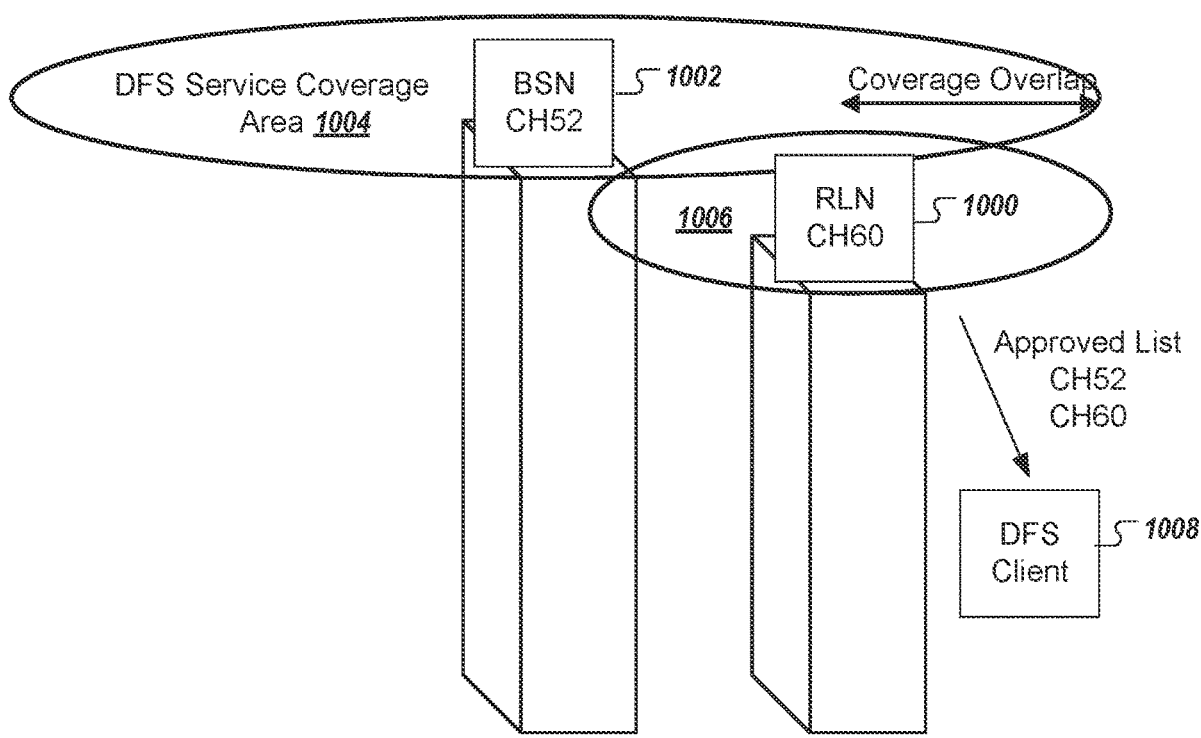
FIG. 10 is a network diagram of a DFS group leader that expands DFS service coverage by a higher-tier DFS group leader in an environment within multiple adjacent buildings according to one embodiment.

In at least one embodiment, the lower-tier RLN DFS service coverage can be expanded by a higher-tier BSN, as illustrated in FIG. 10.

FIG. 10 is a network diagram of a DFS group leader 1000 that expands DFS service coverage by a higher-tier DFS group leader 1002 in an environment within multiple adjacent buildings according to one embodiment. The DFS group leader 1000 can be implemented at an RLN, and the higher-tier DFS group leader 1002 can be implemented at a BSN. The higher-tier DFS group leader 1002 provides a first DFS service coverage area 1004 and includes a first channel (e.g., channel 52) in a first DFS approved list. The lower-tier DFS group leader 1000 provides a second DFS coverage area 1006 and includes a second channel (e.g., channel 60) in a second DFS approved list. Using the DFS group leader discovery process described above, the lower-tier DFS group leader 1000 can expand the second DFS service coverage area 1006 to also include the first DFS service coverage area 1004. That is, the second DFS approved list at the lower-tier DFS group leader 1000 can be expanded to include the first channel. The expanded DFS approved list 1001 (e.g., channel 52 and channel 60) can be provided to a downstream DFS client 1008.

The DFS service coverage area can be expanded by sectorized sweeping as described below.

Figure 11B:
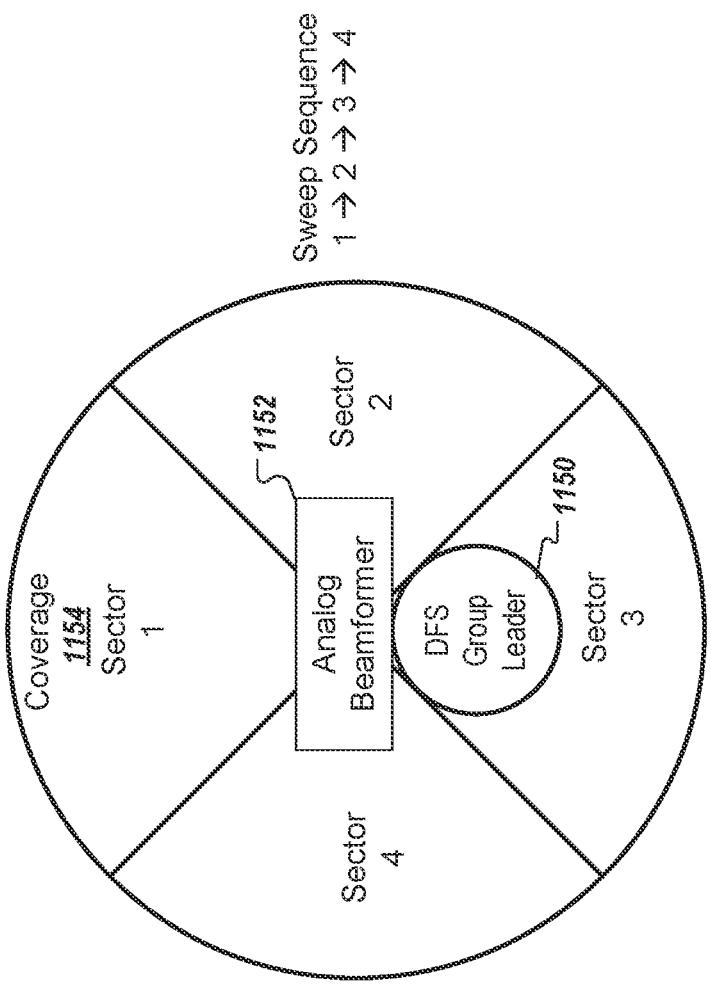
FIG. 11B is a DFS group leader with analog beamformer circuits for sectorized sweeping according to one embodiment.
Figure 11A:
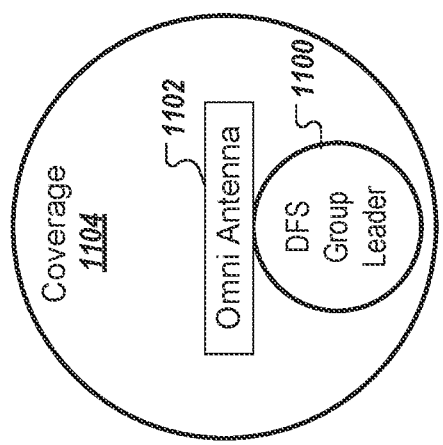
FIG. 11A is a DFS group leader with an omnidirectional antenna for DFS service coverage according to one embodiment.

FIG. 11A is a DFS group leader 1100 with an omnidirectional antenna 1102 for DFS service coverage according to one embodiment. The DFs group leader 1110 uses the omnidirectional antenna 1102 to provide a DFS service coverage area 1104. A DFS Group leader can increase its service range by sectorized sweeping using focused narrow beams, such as illustrated in FIG. 11B.

FIG. 11B is a DFS group leader 1150 with analog beamformer circuits 1152 for sectorized sweeping according to one embodiment. By utilizing the analog beamformer circuits 1152, the DFS group leader 1150 can perform a sectorized CAC sweep according to a sweep sequence. The DFS group leader 1150 can combine the sectorized results to form the extended service coverage area 1154.

In at least one embodiment, the DFS Group leader 1150 starts by performing CAC on one sector. Once the sector is deemed free of radar, the DFS Group leader 1150 directs the analog beamformer circuit 1152 to the next sector and performs CAC on the new sector. After all sectors are deemed free of radar, the DFS Group leader 1150 adds the channel to a DFS Approved list. Although four sectors are illustrated in FIG. 11B, more or fewer sectors can be used for sectorized sweeping in other embodiments.

In at least one embodiment, the DFS group leader 1150 configures the beamforming circuitry 1152 to radiate electromagnetic energy in a first direction. The DFS group leader 1150 performs a first CAC on a first sector while the beamforming circuitry 1152 is configured to radiate electromagnetic energy in the first direction. The first sector corresponds to a first geographical region that is located in the first direction from the DFS group leader 1150. The DFS group leader 1150 configures the beamforming circuitry 1152 to radiate electromagnetic energy in a second direction. The DFS group leader 1150 performs a second CAC on a second sector while the beamforming circuitry 1152 is configured to radiate electromagnetic energy in the second direction. The second sector corresponds to a second geographical region that is located in the second direction from the DFS group leader 1150. In other embodiments, more or fewer sectors can be used.

In at least one embodiment, the DFS group leader 1150 tracks the sectors using a DFS Sweep table. An example of the DFS Sweep table is provided in Table 9 below.

TABLE 9

DFS Sweep table.

| Channel | Sector | Last CAC Timestamp |
|---|---|---|
| 52 | 1 | 1511079571 |
| 52 | 2 | 0 |
| 52 | 3 | 0 |
| 52 | 4 | 0 |

In the case of a radar event, the Last CAC Timestamp of all sectors for the channel is reset to 0.

In another embodiment, the DFS group leader 1150 can include multiple diversity antennas that can be used for sectorized sweeping. For example, one diversity antenna can be directed to cover a first geographical region that is located in a first direction from the DFS group leader 1150 and another diversity antenna can be directed to cover a second geographical region that is located in a second direction from the DFS group leader 1150. Alternatively, the diversity antennas can be used in other ways for sectorized sweeping.

Figure 12:
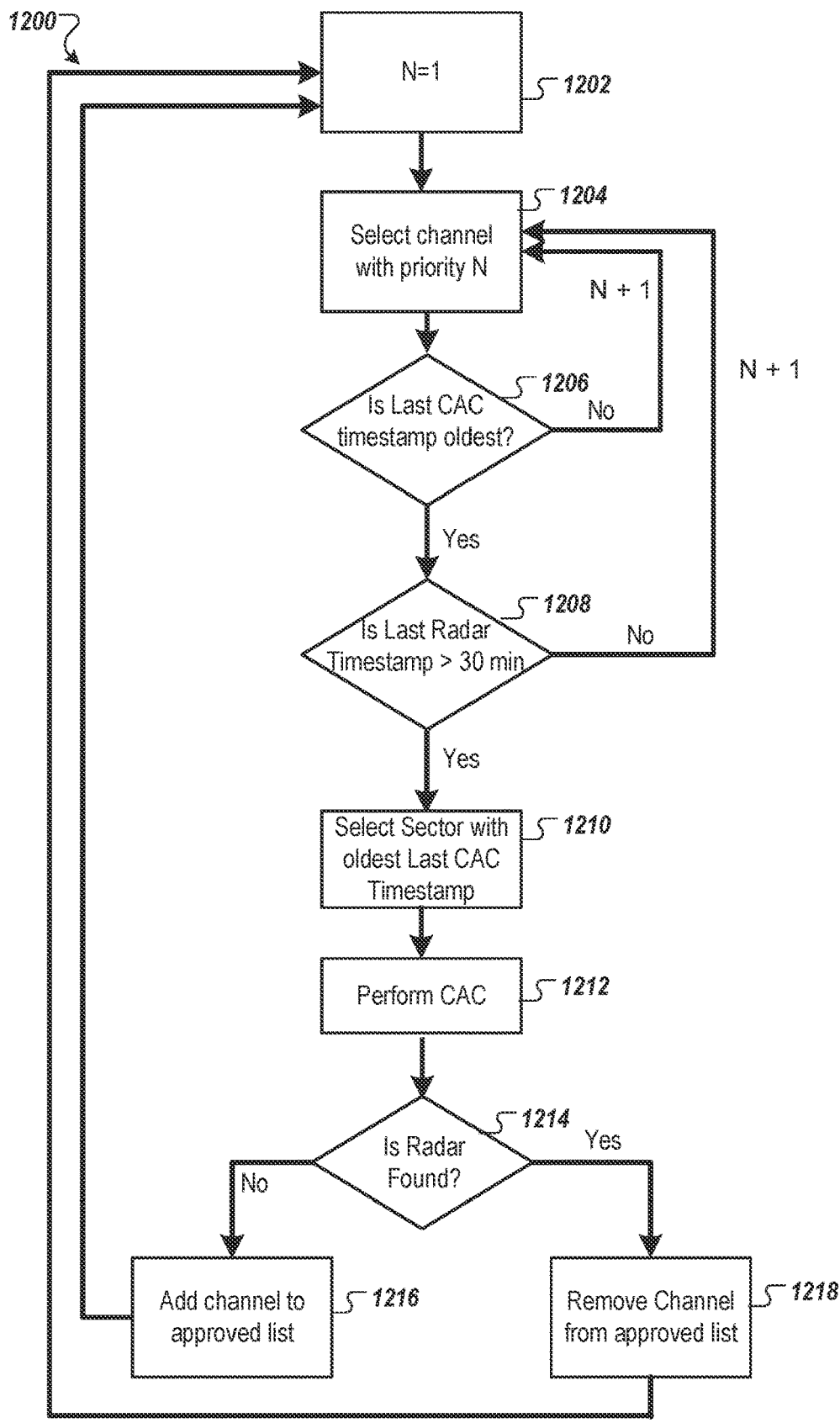
FIG. 12 is a flow diagram of a method of operation for a DFS group leader for sectorized sweeping according to at least one embodiment.

FIG. 12 is a flow diagram of a method 1200 of operation for a DFS group leader for sectorized sweeping according to at least one embodiment. The method 1200 may be performed by processing logic that comprises hardware (e.g., circuitry, dedicated logic, programmable logic, microcode, etc.), software, firmware, or a combination thereof. In one embodiment, the method 1200 may be performed by multi-tier coordinated DFS server 106 of FIG. 1A-1B. In another embodiment, the method 1200 may be performed by the DFS group leaders of FIGS. 1A-3. In another embodiment, the method 1200 may be performed by the first wireless device 102 of FIG. 1A, the first wireless device 152 of FIG. 1B, the first wireless device 202, the second wireless device 204, the third wireless device 206, the fourth wireless device 208 of FIG. 2, the first DFS group leader 304, or the second DFS group leader 306 of FIG. 3.

Referring to FIG. 12, the method 1200 begins by retrieving a DFS priority list (e.g., Table 1) and scans the DFS priority list from the highest priority (1) to the lowest priority (P) by setting a variable, N, equal to 1, where N represents a current priority level (block 1202). In the absence of a cloud connection, the processing logic can use its last DFS priority list. The DFS priority list includes a list of DFS channel identifiers, a bandwidth parameter, and a priority parameter, a "CAC Duration" parameter, a "Last CAC Timestamp," and a "Last Radar Timestamp." The channel identifier defines the channel to perform the CAC. The bandwidth parameter defines the bandwidth to perform the CAC. The priority parameter defines the priority of the channel. The "CAC Duration" defines the amount of time specified for the CAC. The "Last CAC Timestamp" defines when the last CAC was performed. The "Last Radar Timestamp" defines the last radar event on the channel.

At block 1204, the processing logic selects a channel with a priority equal to N. The processing logic determines if the "Last CAC Timestamp" for the selected channel is the oldest (block 1206). If the "Last CAC Timestamp" is not the oldest at block 1206, the processing logic increments N and returns to block 1204. If the "Last CAC Timestamp" is the oldest at block 1206, the processing logic determines if the "Last CAC Timestamp" is greater than a specified amount of time (e.g., 30 minutes) (block 1208). If the "Last CAC Timestamp" is not greater than the specified amount of time at block 1208, the processing logic increments N and returns to block 1204. If the "Last CAC Timestamp" is greater than the specified amount of time at block 1208, the processing logic selects a sector with an oldest Last CAC timestamp (block 1210). The processing logic performs a CAC according to the bandwidth parameter and the CAC duration parameter for the selected sector and channel identifier (block 1212). That is, the processing logic performs the CAC for the CAC duration on the selected sector and selected channel. The processing logic determines whether there are any radar events on the selected sector and selected channel during the CAC (block 1214). If a radar event is found during the CAC, the processing logic removes the channel from the DFS approved list (e.g., Table 2) (or alternatively does not include the channel when generating the DFS approved list) (block 1218) and returns to block 1202. If a radar event is not found during the CAC, the processing logic adds the channel to the DFS approved list (e.g., Table 2) (block 1216) and returns to block 1202. The processing logic can repeat the method 1200 of selecting a channel from the highest priority to the lowest priority, selecting the channel with the oldest Last CAC timestamp, and selecting the sector with the oldest Last CAC timestamp. In at least one embodiment, the processing logic can broadcast the second data (e.g., DFS approved list) in an information element (IE) of a beacon frame. The beacon frame can be sent on a sideband channel, such as in the 2.4 GHz frequency band. Alternatively, the DFS approved list can be queried from the UDP port of the first wireless device. As described herein, the DFS approved list can include the channel identifies, the bandwidth parameter, and the Last CAC timestamp for each of the DFS channels where no radar event is detected during the respective CACs by the first wireless device.

In another embodiment, the processing logic of a first wireless device sends a first request. The processing logic receives, from a second wireless device, a first response to the first request. The first response includes first data and a first RSSI value associated with the first request. The first RSSI value is indicative of a first distance between the first wireless device and the second wireless device, wherein the first data comprises, for each DFS channel of a first set of DFS channels, i) an identifier of the respective DFS channel, ii) a first value indicating a bandwidth of the respective DFS channel, and iii) first timestamp data of a last radar event on the respective DFS channel. The processing logic determines that the first RSSI value, minus a value representing a transmit power of the first wireless device, is greater than a threshold value. The threshold value represents a geographical area surrounding the second wireless device. The processing logic stores the first data. The processing logic selects a first DFS channel of the first set of DFS channels. The processing logic communicates second data with a third wireless device on the first DFS channel. The processing logic monitors for radar events on the first DFS channels. In response to a radar event detected on the first DFS channel, the processing logic selects a second DFS channel of the first set of DFS channels. The selection of the second DFS channel can occur without performing a CAC on the second DFS channel since the other device has already performed the CAC on the second DFS channel and provided it as an approved DFS channel. In at least one embodiment, the processing logic updates a first timestamp of the first timestamp data to a second timestamp of a last radar event on the first DFS channel. The processing logic communicates third data with the third wireless device on the second DFS channel.

In a further embodiment, the processing logic updates the first data to indicate that the first DFS channel is unavailable in response to the radar event detected on the first DFS channel. The processing logic can determine that a specified amount of time has passed since the second timestamp and update the first data to indicate that the first DFS channel is available in response to determining that the specified amount of time has passed since the second timestamp. For example, the processing logic can receive fourth data indicating that the first DFS channel is available from the second wireless device. The processing logic can determine whether to update the first data if the first DFS channel is still available after the specified amount of time has passed.

In another embodiment, the processing logic receives a second response to the first request from a fourth wireless device. The second response includes fourth data and a second RSSI value associated with the first request. The second RSSI value is indicative of a second distance between the first wireless device and the fourth wireless device. The fourth data includes, for each DFS channel of a second set of DFS channels, i) the identifier of the respective DFS channel, ii) the first value indicating the bandwidth of the respective DFS channel, and iii) the first timestamp data of the last radar event on the respective DFS channel. The processing logic determines that the second RSSI value, minus the value representing the transmit power of the first wireless device, is greater than the threshold value. The processing logic stores the fourth data with the first data.

In at least one embodiment, the processing logic determines that the first data and the second data each include the identifier of a third DFS channel that is common to the first set and the second set. In this case, the processing logic stores i) the identifier of the third DFS channel, ii) the first value indicating the bandwidth of the third DFS channel, iii) the first timestamp data of the last radar event on the third DFS channel, and iv) a first identifier of the second wireless device; and stores i) the identifier of the third DFS channel, ii) the first value indicating the bandwidth of the third DFS channel, iii) the first timestamp data of the last radar event on the third DFS channel, and iv) a second identifier of the fourth wireless device. The first value indicating the bandwidth associated with the fourth wireless device is different from the first value indicating the bandwidth associated with the second wireless device.

As described herein, the processing logic can receive the first data via a first wireless connection and can receive the first response to the first request or the second response to the first request via a second wireless connection between the wireless devices. Alternatively, the requests and responses can be communicated via a wired connection between the wireless devices.

As described above, analog beamforming circuits can be used for sectorized sweeping. In another embodiment, a steering mechanism and a directional antenna can extend the DFS service coverage area by rotating the directional antenna and performing a CAC sweep on all sectors, such as illustrated in FIG. 13.

Figure 13:
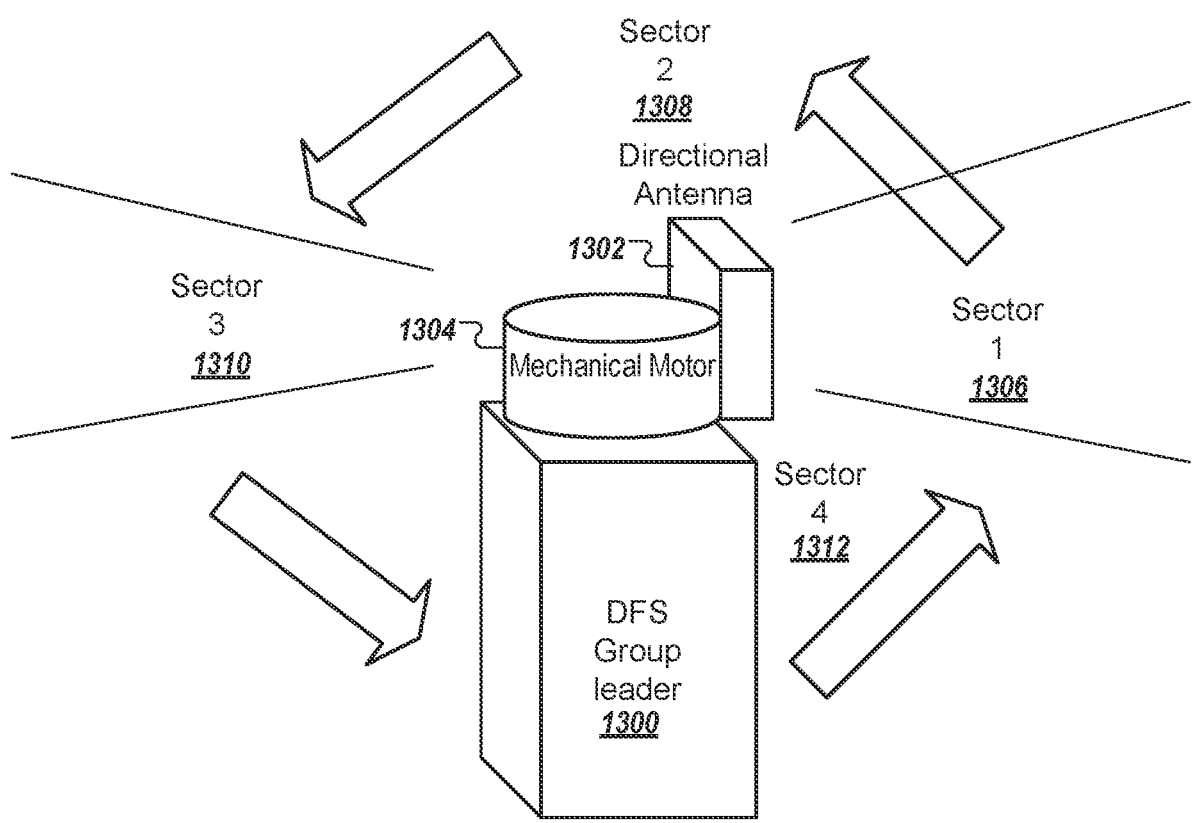
FIG. 13 is a DFS group leader with a directional antenna and a steering mechanism for sectorized sweeping according to at least one embodiment.

FIG. 13 is a DFS group leader 1300 with a directional antenna 1302 and a steering mechanism 1304 for sectorized sweeping according to at least one embodiment. In at least one embodiment, the steering mechanism 1304 is a mechanical motor that can rotate or otherwise position the directional antenna 1302 to point to a first sector 1306. The DFS group leader 1300 performs a first CAC on a first sector 1306 while the directional antenna 1302 is rotated by the steering mechanism 1304 to radiate electromagnetic energy in a first direction. The first sector 1306 corresponds to a first geographical region that is located in the first direction from the DFS group leader 1300. The DFS group leader 1300 uses the steering mechanism 1304 to rotate or otherwise position the directional antenna 1302 to point to a second sector 1308. The DFS group leader 1300 performs a second CAC on a second sector 1308 while the directional antenna 1302 is rotated by the steering mechanism 1304 to radiate electromagnetic energy in a second direction that is different from the first direction. The second sector 1308 corresponds to a second geographical region that is located in the second direction from the DFS group leader 1300. The DFS group leader 1300 uses the steering mechanism 1304 to rotate or otherwise position the directional antenna 1302 to point to a third sector 1310. The DFS group leader 1300 performs a third CAC on a third sector 1310 while the directional antenna 1302 is rotated by the steering mechanism 1304 to radiate electromagnetic energy in a third direction that is different from the first direction. The third sector 1310 corresponds to a third geographical region that is located in the second direction from the DFS group leader 1300. The DFS group leader 1300 uses the steering mechanism 1304 to rotate or otherwise position the directional antenna 1302 to point to a fourth sector 1312. The DFS group leader 1300 performs a fourth CAC on a fourth sector 1312 while the directional antenna 1302 is rotated by the steering mechanism 1304 to radiate electromagnetic energy in a fourth direction that is different from the first direction. The fourth sector 1312 corresponds to a fourth geographical region that is located in the fourth direction from the DFS group leader 1300. In other embodiments, more or fewer sectors can be used.

Figure 14:
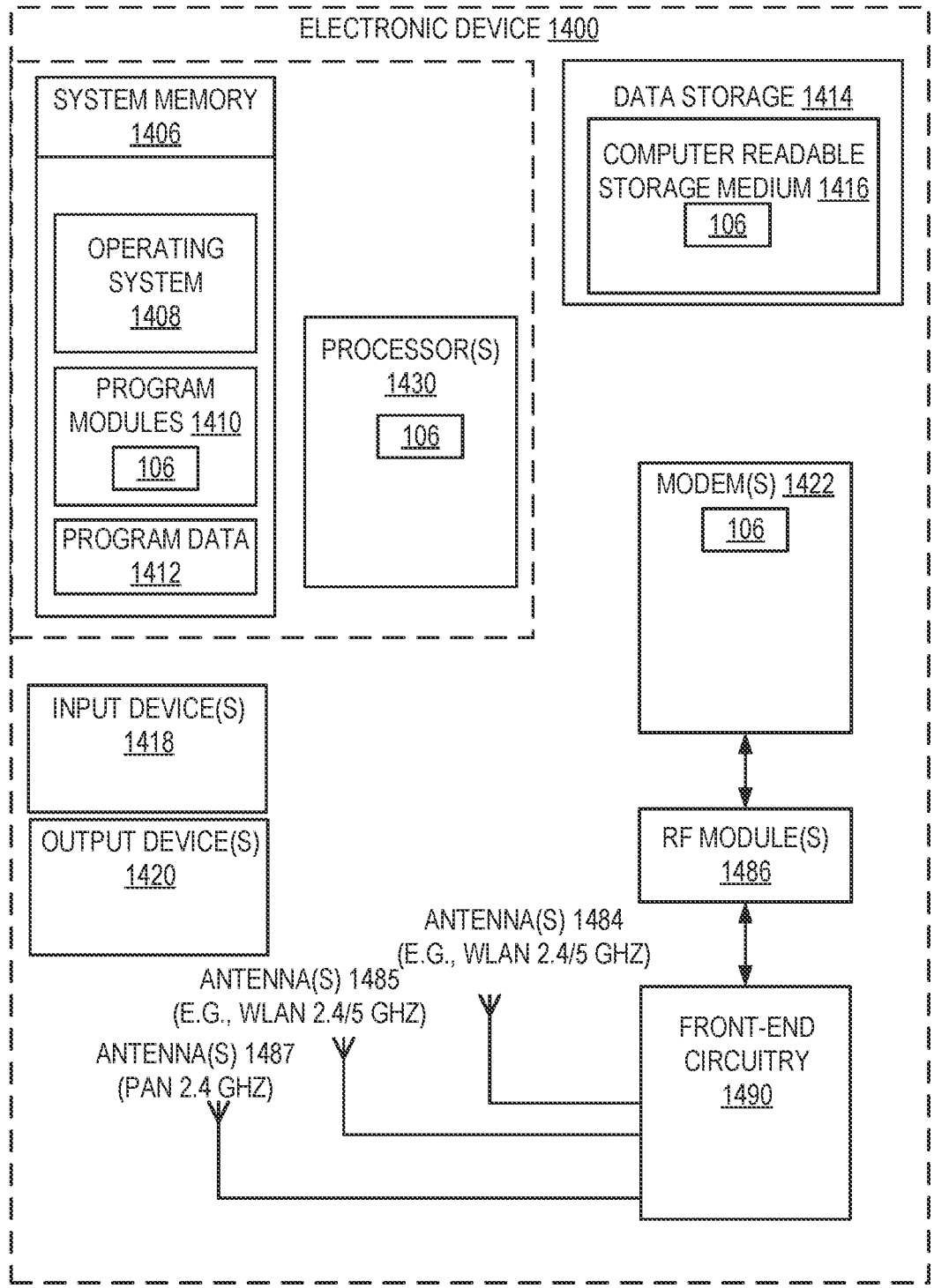
FIG. 14 is a block diagram of a network hardware device with a multi-tier coordinated DFS server according to one embodiment.

FIG. 14 is a block diagram of a network hardware device 1400 with a multi-tier coordinated DFS server 106 according to one embodiment. The network hardware device 1400 may correspond to any of the nodes or devices described above with respect to FIGS. 1-13. Alternatively, the network hardware device 1400 may be other electronic devices, as described herein.

The network hardware device 1400 includes one or more processor(s) 1430, such as one or more CPUs, microcontrollers, field-programmable gate arrays, or other types of processing devices. The network hardware device 1400 also includes system memory 1406, which may correspond to any combination of volatile and/or non-volatile storage mechanisms (e.g., one or more memory devices). The system memory 1406 stores information that provides operating system component 1408, various program modules 1410, program data 1412, and/or other components. In one embodiment, the system memory 1406 stores instructions of methods to control the operation of the network hardware device 1400. The network hardware device 1400 performs functions by using the processor(s) 1430 to execute instructions provided by the system memory 1406. In one embodiment, the program modules 1410 may include the multi-tier coordinated DFS server 106 described herein (e.g., the method 400 of FIG. 4, or the like). In another embodiment, the program modules 1410 may include the multi-tier coordinated DFS client described herein (e.g., method 800 of FIG. 8, or the like).

In at least one embodiment, a processing device is operatively coupled to a memory device that stores instructions. The processing device executes instructions to perform various operations, such as those operations described herein.

The network hardware device 1400 also includes a data storage device 1414 that may be composed of one or more types of removable storage and/or one or more types of non-removable storage. The data storage device 1414 includes a computer-readable storage medium 1416 on which is stored one or more sets of instructions embodying any of the methodologies or functions described herein. Instructions for the program modules 1410 (e.g., 106) may reside, completely or at least partially, within the computer-readable storage medium 1416, system memory 1406, and/ or within the processor(s) 1430 during execution thereof by the network hardware device 1400, the system memory 1406 and the processor(s) 1430 also constituting computer-readable media. The network hardware device 1400 may also include one or more input devices 1418 (keyboard, mouse device, specialized selection keys, etc.) and one or more output devices 1420 (displays, printers, audio output mechanisms, etc.).

The network hardware device 1400 further includes a modem 1422 to allow the network hardware device 1400 to communicate via wireless connections (e.g., such as provided by the wireless communication system) with other computing devices, such as remote computers, an item providing system, and so forth. The modem 1422 can be connected to one or more RF modules 1486. The RF modules 1486 may be a WLAN module, a WAN module, PAN module, GPS module, or the like. The antenna structures (antenna(s) 1484, 1485, 1487) are coupled to the RF circuitry 1483, which is coupled to the modem 1422. The RF circuitry 1483 may include radio front-end circuitry, antenna-switching circuitry, impedance matching circuitry, or the like. The antennas 1484 may be GPS antennas, NFC antennas, other WAN antennas, WLAN or PAN antennas, or the like. The modem 1422 allows the network hardware device 1400 to handle both voice and non-voice communications (such as communications for text messages, multimedia messages, media downloads, web browsing, etc.) with a wireless communication system. The modem 1422 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed downlink packet access (HSDPA), Wi-Fi®, Long Term Evolution (LTE) and LTE Advanced (sometimes generally referred to as 4G), etc.

The modem 1422 may generate signals and send these signals to the antenna(s) 1484 of a first type (e.g., WLAN 5 GHz), antenna(s) 1485 of a second type (e.g., WLAN 2.4 GHz), and/or antenna(s) 1487 of a third type (e.g., WAN), via RF circuitry 1483, and RF module(s) 1486 as described herein. Antennas 1484, 1485, 1487 may be configured to transmit in different frequency bands and/or using different wireless communication protocols. The antennas 1484, 1485, 1487 may be directional, omnidirectional, or non-directional antennas. In addition to sending data, antennas 1484, 1485, 1487 may also receive data, which is sent to appropriate RF modules connected to the antennas. One of the antennas 1484, 1485, 1487 may be any combination of the antenna structures described herein.

In one embodiment, the network hardware device 1400 establishes a first connection using a first wireless communication protocol, and a second connection using a different wireless communication protocol. The first wireless connection and second wireless connection may be active concurrently. For example, if a network hardware device is receiving a media item from another network hardware device via the first connection and transferring a file to another user device via the second connection simultaneously. Alternatively, the two connections may be active concurrently during wireless communications with multiple devices. In one embodiment, the first wireless connection is associated with a first resonant mode of an antenna structure that operates at a first frequency band, and the second wireless connection is associated with a second resonant mode of the antenna structure that operates at a second frequency band. In another embodiment, the first wireless connection is associated with a first antenna structure, and the second wireless connection is associated with a second antenna. In other embodiments, the first wireless connection may be associated with content distribution within mesh nodes of a wireless mesh network (WMN), and the second wireless connection may be associated with serving a content file to a client consumption device, as described herein.

Though a modem 1422 is shown to control transmission and reception via the antenna (1484, 1485, 1487), the network hardware device 1400 may alternatively include multiple modems, each of which is configured to transmit/ receive data via a different antenna and/or wireless transmission protocol.

In other embodiment, one or more hardware network devices can be mesh network devices in a WMN. A WMN can contain multiple mesh network devices, organized in a mesh topology. The mesh network devices in the WMN cooperate in the distribution of content files to client consumption devices in an environment, such as in an environment of limited connectivity to broadband Internet infrastructure. The embodiments described herein may be implemented where there is the lack, or slow rollout, of suitable broadband Internet infrastructure in developing nations, for example. These mesh networks can be used in the interim before broadband Internet infrastructure becomes widely available in those developing nations. The network hardware devices are also referred to herein as mesh routers, mesh network devices, mesh nodes, Meshboxes, or Meshbox nodes. Multiple network hardware devices wirelessly are connected through a network backbone formed by multiple peer-to-peer (P2P) wireless connections (i.e., wireless connections between multiple pairs of the network hardware devices). The multiple network devices are wirelessly connected to one or more client consumption devices by node-to-client (N2C) wireless connections. The multiple network devices are wirelessly connected to the MNCS device by cellular connections. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The embodiments of the mesh network devices may be used to deliver content, such as video, music, literature, or the like, to users who do not have access to broadband Internet connections because the mesh network devices may be deployed in an environment of limited connectivity to broadband Internet infrastructure. In some of the embodiments described herein, the mesh network architecture does not include "gateway" nodes that are capable of forwarding broadband mesh traffic to the Internet. The mesh network architecture may include a limited number of point-of-presence (POP) nodes that do have access to the Internet, but the majority of mesh network devices is capable of forwarding broadband mesh traffic between the mesh network devices for delivering content to client consumption devices that would otherwise not have broadband connections to the Internet. Alternatively, instead of the POP node having access to broadband Internet infrastructure, the POP node is coupled to storage devices that store the available content for the WMN. The WMN may be self-contained in the sense that content lives in, travels through, and is consumed by nodes in the mesh network. In some embodiments, the mesh network architecture includes a large number of mesh nodes, called Meshbox nodes. From a hardware perspective, the Meshbox node functions much like an enterprise-class router with the added capability of supporting P2P connections to form a network backbone of the WMN. From a software perspective, the Meshbox nodes provide much of the capability of a standard content distribution network (CDN), but in a localized manner. The WMN can be deployed in a geographical area in which broadband Internet is limited. The WMN can scale to support a geographic area based on the number of mesh network devices, and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical, or access patterns are predictable. The embodiments described herein are compatible with existing content delivery technologies and may leverage architectural solutions, such as CDN services like the Amazon AWS CloudFront service. Amazon CloudFront CDN is a global CDN service that integrates with other Amazon Web services products to distribute content to end-users with low latency and high data transfer speeds. The embodiments described herein can be an extension to this global CDN, but in environments where there is limited broadband Internet infrastructure. The embodiments described herein may provide users in these environments with a content delivery experience that is equivalent to what the users would receive on a traditional broadband Internet connection. The embodiments described herein may be used to optimize deployment for traffic types (e.g., streaming video) that are increasingly becoming a significant percentage of broadband traffic and taxing existing infrastructure in a way that is not sustainable.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless device comprising:
   a memory device that stores instructions related to a multi-tier coordinated Dynamic Frequency Selection (DFS) server;
   a wireless local area network (WLAN) radio; and
   a processing device coupled to the WLAN radio, wherein the processing device is to execute the instructions that cause the wireless device to perform operations comprising:
      receive, from a cloud service, a first data comprising, for each DFS channel of a first set of DFS channels:
         i) an identifier of the respective DFS channel,
         ii) a first value indicating a bandwidth of the respective DFS channel,
         iii) a priority value of the respective DFS channel,
         iv) a second value indicating a duration of a channel availability check (CAC) for the respective DFS channel,
         v) first timestamp data of a last CAC performed on the respective DFS channel, and
         vi) second timestamp data of a last radar event detected on the respective DFS channel;
      perform a CAC on each DFS channel of the first set of DFS channels in an order starting with a DFS channel having a highest priority value and ending with a DFS channel in the first set having a lower priority value, and wherein, after the CAC is performed, the first timestamp data is updated;
      generate second data comprising, for each DFS channel of the first set of the first set of DFS channels in which no radar event is found during the respective CAC and the second timestamp data is greater than a specified amount of time, i) the identifier of the respective DFS channel, ii) the first value, and v) the first timestamp data;
      receive, from a second wireless device, a first request for multi-tier coordinated DFS service;
      determine a first receive signal strength indicator (RSSI) value associated with the first request, wherein the first RSSI value is indicative of a first distance between the wireless device and the second wireless device; and
      send a first response to the second wireless device, the first response comprising the second data and the first RSSI value.

2. The wireless device of claim 1, wherein the operations further comprising:
   send a second request to a third wireless device that stores instructions related to a second multi-tier coordinated DFS server; and
   receive a second response from the third wireless device, the second response comprising third data and a second RSSI value associated with the second request, wherein the second RSSI value is indicative of a second distance between the wireless device and the third wireless device, and wherein the third data comprises i) the identifier of the respective DFS channel, ii) the first value, and v) the first timestamp data for each DFS channel;
   determine that the second RSSI value minus a value representing a transmit power of the wireless device, is greater than a threshold value, the threshold value representing a boundary of a service area of the second multi-tier coordinated DFS server; and
   update the second data to include contents of the third data.

3. A method comprising:
   receiving, by a first wireless device, first data, wherein the first data comprises, for each DFS channel of a first set of DFS channels, i) an identifier of the respective DFS channel of the first set of DFS channels, ii) a first value indicating a bandwidth of the respective DFS channel of the first set of DFS channels, iii) a second value indicating a duration of a channel availability check (CAC) associated with the respective DFS channel of the first set of DFS channels, iv) first timestamp data associated with a prior CAC associated with the respective DFS channel of the first set of DFS channels, and v) second timestamp data of a last radar event associated with the respective DFS channel of the first set of DFS channels;
   performing a CAC on each DFS channel of the first set of DFS channels, based on the first value and the second value;
   identifying, in the first set of DFS channels, one or more DFS channels in which no radar event is found;
   generating second data comprising the identifier associated with the respective DFS channel of the one or more DFS channels, the first value indicating the bandwidth of the respective DFS channel of the one or more DFS channels, and third timestamp data associated with each DFS channel of the one or more DFS channels; and
   sending the second data to a second wireless device.

4. The method of claim 3, further comprising:
   receiving, from the second wireless device, a first request for the second data;
   determining a first receive signal strength indicator (RSSI) value associated with the first request, wherein the first RSSI value is indicative of a first distance between the first wireless device and the second wireless device; and sending the first RSSI value to the second wireless device in connection with the second data.

5. The method of claim 3, wherein receiving the first data comprises receiving the first data from a cloud service, wherein the first data is prioritized by the cloud service.

6. The method of claim 3, wherein receiving the first data comprises receiving the first data from a third wireless device, wherein the first data is prioritized by the third wireless device.

7. The method of claim 3, wherein the first data further comprises a priority value associated the respective DFS channel of the first set of DFS channels, and wherein performing the CAC is further based on the respective priority values associated with the first set of DFS channels.

8. The method of claim 7, further comprising:
identifying, by the first wireless device, a DFS channel of the one or more DFS channels having an oldest timestamp from the first timestamp data;
determining, by the first wireless device, that a specified amount of time has passed since the second timestamp data, associated with the DFS channel having the oldest timestamp;
performing a CAC on the DFS channel corresponding to the oldest timestamp; and
removing the DFS channel, corresponding to the oldest timestamp, from the first data.

9. The method of claim 3, further comprising:
receiving, by the first wireless device from a third wireless device, third data including: a second receive signal strength indicator (RSSI) value, wherein the second RSSI value is indicative of a distance between the wireless device and the third wireless device, and wherein the third data comprises, for each DFS channel of a third set of DFS channels, i) the identifier of the respective DFS channel, ii) the first value, and v) the second timestamp data for each DFS channel;
determining that the second RSSI value minus a value representing a transmit power of the first wireless device, is greater than a threshold value, wherein the threshold value represents a geographical area surrounding the third wireless device; and
updating the second data to include contents of the third data.

10. The method of claim 9, further comprising:
receiving, from the second wireless device, a third request for the second data; and
sending a third response to the second wireless device, the third response comprising the second data that includes the contents of the third data.

11. The method of claim 4, wherein the first wireless device comprises analog beamforming circuitry, wherein performing the CAC comprises:
performing a first CAC on a first sector, wherein the first sector corresponds to a first geographical region that is located in a first direction from the first wireless device; and
performing a second CAC on a second sector, wherein the second sector corresponds to a second geographical region that is located in a second direction from the first wireless device.

12. The method of claim 4, wherein the first wireless device comprises a directional antenna and a steering mechanism configured to rotate the directional antenna, wherein performing the CAC comprises:

performing a first CAC on a first sector, wherein the first sector corresponds to a first geographical region that is located in a first direction from the first wireless device; and performing a second CAC on a second sector, wherein the second sector corresponds to a second geographical region that is located in a second direction from the first wireless device.

13. The method of claim 3, wherein receiving the first data comprises receiving the first data via a wired connection between the first wireless device and the second wireless device.

14. The method of claim 3, wherein receiving the first data comprises receiving the first data via a first wireless connection; and wherein sending the second data comprises sending the second data via a second wireless connection between the first wireless device and the second wireless device, the first wireless connection and the second wireless connection being different.

15. A method comprising:
sending, by a first wireless device, a first request;
receiving, by the first wireless device from a second wireless device, a first response to the first request, the first response comprising first data and a first receive signal strength indicator (RSSI) value associated with the first request, wherein the first RSSI value is indicative of a first distance between the first wireless device and the second wireless device, wherein the first data comprises, for each DFS channel of a first set of DFS channels, i) an identifier of the respective DFS channel of the first set of DFS channels, ii) a first value indicating a bandwidth of the respective DFS channel of the first set of DFS channels, and iii) first timestamp data of a last radar event on the respective DFS channel of the first set of DFS channels;
determining that the first RSSI value minus a value representing a transmit power of the first wireless device, is greater than a threshold value, wherein the threshold value represents a geographical area surrounding the second wireless device; and
storing, by the first wireless device, the first data;
sending, by the first wireless device on a first DFS channel of the first set of DFS channels, second data with a third wireless device;
detecting a radar event on the first DFS channel,
updating the first timestamp data to second timestamp data of a last radar event on the first DFS channel; and
sending, by the first wireless device over a second DFS channel of the first set of DFS channels, third data to the third wireless device.

16. The method of claim 15, further comprising:
updating the first data to indicate that the first DFS channel is unavailable in response to the radar event detected on the first DFS channel;
determining that a specified amount of time has passed since the second timestamp data; and
updating the first data to indicate that the first DFS channel is available in response to determining that the specified amount of time has passed since the second timestamp data.

17. The method of claim 15, further comprising:
receiving, by the first wireless device from a fourth wireless device, a second response to the first request, the second response comprising fourth data and a second RSSI value associated with the first request, wherein the second RSSI value is indicative of a second distance between the first wireless device and the fourth wireless device, wherein the fourth data comprises, for each DFS channel of a second set of DFS channels, i) the identifier of the respective DFS channel of the second set of DFS channels, ii) the first value indicating the bandwidth of the respective DFS channel of the second set of DFS channels, and iii) the first timestamp data of the last radar event on the respective DFS channel of the second set of DFS channels;

determining that the second RSSI value minus the value representing the transmit power of the first wireless device, is greater than the threshold value; and storing, by the first wireless device, the fourth data with the first data.

18. The method of claim 17, further comprising:

determining that the first data and the second data each comprise the identifier of a third DFS channel that is common to the first set and the second set, wherein storing the fourth data with the first data comprises:

storing i) the identifier of the third DFS channel, ii) the first value indicating the bandwidth of the third DFS channel, iii) the first timestamp data of the last radar event on the third DFS channel, and iv) a first identifier of the second wireless device; and storing i) the identifier of the third DFS channel, ii) the first value indicating the bandwidth of the third DFS channel, iii) the first timestamp data of the last radar event on the third DFS channel, and iv) a second identifier of the fourth wireless device, wherein the first value indicating the bandwidth associated with the fourth wireless device is different from the first value indicating the bandwidth associated with the second wireless device.

19. The method of claim 15, wherein sending the first request comprises sending the first request via a first wireless connection between the first wireless device and the second wireless device, and wherein receiving the first response to the first request comprises receiving the first response via a second wireless connection between the first wireless device and the second wireless device.

20. The method of claim 15, wherein sending the first request comprises sending the first request via a wired connection between the first wireless device and the second wireless device.

* * * * *